US012096202B2

(12) United States Patent
Yamamoto et al.

(10) Patent No.: US 12,096,202 B2
(45) **Date of Patent: *Sep. 17, 2024**

(54) AUDIO PROCESSING APPARATUS AND METHOD, AND PROGRAM

(71) Applicant: Sony Group Corporation, Tokyo (JP)

(72) Inventors: Yuki Yamamoto, Chiba (JP); Toru Chinen, Kanagawa (JP); Minoru Tsuji, Chiba (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,001

(22) Filed: Nov. 23, 2022

(65) Prior Publication Data

US 2023/0078121 A1 Mar. 16, 2023

Related U.S. Application Data

(63) Continuation of application No. 17/474,669, filed on Sep. 14, 2021, now Pat. No. 11,540,080, which is a (Continued)

(30) Foreign Application Priority Data

Jun. 24, 2015 (JP) ................................ 2015-126650
Jul. 28, 2015 (JP) ................................ 2015-148683

(51) Int. Cl.
*H04S 7/00* (2006.01)
*G10L 19/008* (2013.01)

(Continued)

(52) U.S. Cl.
CPC ............ *H04S 7/303* (2013.01); *G10L 19/008* (2013.01); *H04S 3/008* (2013.01); *H04S 5/02* (2013.01);

(Continued)

(58) Field of Classification Search
CPC .......... H04S 1/007; H04S 3/008; H04S 5/005; H04S 7/30; H04S 2400/01; H04S 2400/11
See application file for complete search history.

(56) References Cited

U.S. PATENT DOCUMENTS 10,567,903 B2 2/2020 Yamamoto et al.
11,140,505 B2 10/2021 Yamamoto et al.

(Continued)

FOREIGN PATENT DOCUMENTS

BR 8904422 A 4/1990
CA 1037877 A 9/1978

(Continued)

OTHER PUBLICATIONS

International Search Report and English translation thereof dated Jul. 19, 2016 in connection with International Application No. PCT/JP2016/067195.

(Continued)

*Primary Examiner* — Kile O Blair
(74) *Attorney, Agent, or Firm* — Wolf, Greenfield & Sacks, P.C.

(57) ABSTRACT

The present technology relates to an audio processing apparatus and method and a program that make it possible to obtain sound of higher quality. An acquisition unit acquires an audio signal and metadata of an object. A vector calculation unit calculates, based on a horizontal direction angle and a vertical direction angle included in the metadata of the object and indicative of an extent of a sound image, a spread vector indicative of a position in a region indicative of the extent of the sound image. A gain calculation unit calculates, (Continued)

based on the spread vector, a VBAP gain of the audio signal in regard to each speaker by VBAP. The present technology can be applied to an audio processing apparatus.

3 Claims, 20 Drawing Sheets

Related U.S. Application Data continuation of application No. 16/734,211, filed on Jan. 3, 2020, now Pat. No. 11,140,505, which is a continuation of application No. 15/737,026, filed as application No. PCT/JP2016/067195 on Jun. 9, 2016, now Pat. No. 10,567,903.

(51) Int. Cl.
*H04S 3/00* (2006.01)
*H04S 5/02* (2006.01)

(52) U.S. Cl.
CPC ....... *H04S 2400/01* (2013.01); *H04S 2400/11* (2013.01); *H04S 2400/13* (2013.01); *H04S 2400/15* (2013.01)

(56) References Cited

U.S. PATENT DOCUMENTS

| | | | |
|---|---|---|---|
| 2010/0157726 | A1 | 6/2010 | Ando |
| 2012/0237062 | A1 | 9/2012 | Korn |
| 2014/0023197 | A1 | 1/2014 | Xiang et al. |
| 2014/0119581 | A1 | 5/2014 | Tsingos et al. |
| 2016/0028633 | A1 | 1/2016 | Durand et al. |
| 2016/0286333 | A1 | 9/2016 | Robinson et al. |
| 2018/0160250 | A1 | 6/2018 | Yamamoto et al. |
| 2020/0145777 | A1 | 5/2020 | Yamamoto et al. |
| 2021/0409892 | A1 | 12/2021 | Yamamoto et al. |

FOREIGN PATENT DOCUMENTS

| | | | |
|---|---|---|---|
| CA | 2279117 | A1 | 1/2000 |
| CN | 1672464 | A | 9/2005 |
| CN | 1976546 | A | 6/2007 |
| CN | 101484935 | A | 7/2009 |
| CN | 103650535 | A | 3/2014 |
| CN | 104604254 | A | 5/2015 |
| EP | 2458881 | A2 | 5/2012 |
| EP | 2458895 | A2 | 5/2012 |
| JP | 2006-128816 | A | 5/2006 |
| JP | 2008124639 | A | 5/2008 |
| JP | 2010-536299 | A | 11/2010 |
| JP | 2014-090504 | A | 5/2014 |
| JP | 2014-520491 | A | 8/2014 |
| JP | 2015-080119 | A | 4/2015 |
| WO | WO 2014/160576 | A2 | 10/2014 |
| WO | WO 2015/012122 | A1 | 1/2015 |

OTHER PUBLICATIONS

Written Opinion and English translation thereof dated Jul. 19, 2016 in connection with International Application No. PCT/JP2016/067195.
International Preliminary Report on Patentability and English translation thereof dated Jan. 4, 2018 in connection with International Application No. PCT/JP2016/067195.
Korean Office Action dated May 3, 2018 in connection with Korean Application No. 10-2017-7035890 and English translation thereof.
Extended European Search Report dated Jan. 23, 2019 in connection with European Application No. 16814177.8.
Chinese Office Action dated Aug. 22, 2019 in connection with Chinese Application No. 201680034827.1 and English translation thereof.
Extended European Search Report dated Mar. 31, 2020 in connection with European Application No. 20155520.8.
Japanese Office Action dated Jul. 6, 2020 in connection with Japanese Application No. 2017-525183 and English translation thereof.
[No Author Listed], Annex—Proposed modifications to the text of ISO/IEC 23008-3, Information technology—High efficiency coding and media delivery in heterogeneous environments—Part 3: 3D audio, ISO/IEC JTC 1/SC 29, Aug. 2014, Sapporo, Japan, N14747, 31 pages.
[No Author Listed], Information technology—High efficiency coding and media delivery in heterogeneous environments—Part 3: 3D audio, ISO/IEC JTC 1/SC 29, Jul. 25, 2014, 433 pages.
[No Author Listed], Information technology—High efficiency coding and media delivery in heterogeneous environments—Part 3: 3D audio, Amendment 3: MPEG-H 3D Audio Phase 2, ISO/IEC JTC 1/SC 29/WG 11, 23008-3:2015, Nov. 16, 2015, 436 pages.
[No Author Listed], Information technology—High efficiency coding and media delivery in heterogeneous environments—Part 3: 3D audio, Amendment 1: Mpeg-H, 3D Audio Profiles and Levels, ISO/IEC JTC 1/SC 29/WG 11, 23008-3:201x/PDAM 1, Oct. 24, 2014, 7 pages.
Fueg et al., Metadata Updates to MPEG-H 3D Audio, International Organisation for Standardisation, ISO/IEC JTC1/SC29/WG11, Coding of Moving Pictures and Audio, MPEG 2015, M36586, Jun. 2015, Warsaw, Poland, 51 pages.
Herre et al., MPEG-H Audio—The New Standard for Universal Spatial/3D Audio Coding, Journal of the Audio Engineering Society, Dec. 2014, vol. 62, No. 12, pp. 821-830.
Pulkki V., Uniform Spreading of Amplitude Panned Virtual Sources, Proc. IEEE Workshop on Applications of Signal Processing to Audio and Acoustics, New Paltz, New York, Oct. 17-20, 1999, 4 pages.
Pulkki V., Virtual Sound Source Positioning Using Vector Base Amplitude Panning, Laboratory of Acoustics and Audio Signal Processing, vol. 45, No. 6, Jun. 1997, pp. 456-466.

AUDIO PROCESSING APPARATUS AND METHOD, AND PROGRAM

CROSS REFERENCE TO RELATED APPLICATIONS

This Application is a Continuation of U.S. application Ser. No. 17/474,669, U.S. Pat. No. 11,540,080, filed on Sep. 14, 2021, entitled "AUDIO PROCESSING APPARATUS AND METHOD, AND PROGRAM," which is a Continuation of U.S. application Ser. No. 16/734,211, U.S. Pat. No. 11,140, 505, filed on Jan. 3, 2020, entitled "AUDIO PROCESSING APPARATUS AND METHOD, AND PROGRAM," which is a Continuation of U.S. application Ser. No. 15/737,026, U.S. Pat. No. 10,567,903, filed Dec. 15, 2017, entitled "AUDIO PROCESSING APPARATUS AND METHOD, AND PROGRAM", which is a national stage filing under 35 U.S.C. 371 of International Patent Application Serial No. PCT/JP2016/067195, filed Jun. 9, 2016. Foreign priority benefits are claimed under 35 U.S.C. § 119(a)-(d) or 35 U.S.C. § 365(b) of Japanese application number JP2015-148683, filed Jul. 28, 2015 and Japanese application number JP2015-126650, filed Jun. 24, 2015. The entire contents of each of these applications is incorporated herein by reference in its entirety.

TECHNICAL FIELD

The present technology relates to an audio processing apparatus and method and a program, and particularly to an audio processing apparatus and method and a program by which sound of higher quality can be obtained.

BACKGROUND ART

Conventionally, as a technology for controlling localization of a sound image using a plurality of speakers, VBAP (Vector Base Amplitude Panning) is known (for example, refer to NPL 1).

In the VBAP, by outputting sound from three speakers, a sound image can be localized at one arbitrary point at the inner side of a triangle defined by the three speakers.

However, it is considered that, in the real world, a sound image is localized not at one point but is localized in a partial space having a certain degree of extent. For example, it is considered that, while human voice is generated from the vocal cords, vibration of the voice is propagated to the face, the body and so forth, and as a result, the voice is emitted from a partial space that is the entire human body.

As a technology for localizing sound in such a partial space as described above, namely, as a technology for extending a sound image, MDAP (Multiple Direction Amplitude Panning) is generally known (for example, refer to NPL 2). Further, the MDAP is used also in a rendering processing unit of the MPEG-H 3D (Moving Picture Experts Group-High Quality Three-Dimensional) Audio standard (for example, refer to NPL 3).

CITATION LIST

Non Patent Literature

[NPL 1]
Ville Pulkki, "Virtual Sound Source Positioning Using Vector Base Amplitude Panning," Journal of AES, vol. 45, no. 6, pp. 456-466, 1997

[NPL 2]
Ville-Pulkki, "Uniform Spreading of Amplitude Panned Virtual Sources," Proc. 1999 IEEE Workshop on Applications of Signal Processing to Audio and Acoustics, New Paltz, New York, Oct. 17-20, 1999
[NPL 3]
ISO/IEC JTC1/SC29/WG11 N14747, August 2014, Sapporo, Japan, "Text of ISO/IEC 23008-3/DIS, 3D Audio"

SUMMARY

Technical Problem

However, the technology described above fails to obtain sound of sufficiently high quality.

For example, in the MPEG-H 3D Audio standard, information indicative of a degree of extent of a sound image called spread is included in metadata of an audio object and a process for extending a sound image is performed on the basis of the spread. However, in the process for extending a sound image, there is a constraint that the extent of a sound image is symmetrical in the upward and downward direction and the leftward and rightward direction with respect to the center at the position of the audio object. Therefore, a process that takes a directionality (radial direction) of sound from the audio object into consideration cannot be performed and sound of sufficiently high quality cannot be obtained.

The present technology has been made in view of such a situation as described above and makes it possible to obtain sound of higher quality.

Solution to Problem

An audio processing apparatus according to one aspect of the present technology includes an acquisition unit configured to acquire metadata including position information indicative of a position of an audio object and sound image information configured from a vector of at least two or more dimensions and representative of an extent of a sound image from the position, a vector calculation unit configured to calculate, based on a horizontal direction angle and a vertical direction angle of a region representative of the extent of the sound image determined by the sound image information, a spread vector indicative of a position in the region, and a gain calculation unit configured to calculate, based on the spread vector, a gain of each of audio signals supplied to two or more sound outputting units positioned in the proximity of the position indicated by the position information.

The vector calculation unit may calculate the spread vector based on a ratio between the horizontal direction angle and the vertical direction angle.

The vector calculation unit may calculate the number of spread vectors determined in advance.

The vector calculation unit may calculate a variable arbitrary number of spread vectors.

The sound image information may be a vector indicative of a center position of the region.

The sound image information may be a vector of two or more dimensions indicative of an extent degree of the sound image from the center of the region.

The sound image information may be a vector indicative of a relative position of a center position of the region as viewed from a position indicated by the position information.

The gain calculation unit may calculate, the gain for each spread vector in regard to each of the sound outputting units, calculate an addition value of the gains calculated in regard to the spread vectors for each of the sound outputting units, quantize the addition value into a gain of two or more values for each of the sound outputting units, and calculate a final gain for each of the sound outputting units based on the quantized addition value.

The gain calculation unit may select the number of meshes each of which is a region surrounded by three ones of the sound outputting units and which number is to be used for calculation of the gain and calculate the gain for each of the spread vectors based on a result of the selection of the number of meshes and the spread vector.

The gain calculation unit may select the number of meshes to be used for calculation of the gain, whether or not the quantization is to be performed and a quantization number of the addition value upon the quantization and calculate the final gain in response to a result of the selection.

The gain calculation unit may select, based on the number of the audio objects, the number of meshes to be used for calculation of the gain, whether or not the quantization is to be performed and the quantization number.

The gain calculation unit may select, based on an importance degree of the audio object, the number of meshes to be used for calculation of the gain, whether or not the quantization is to be performed and the quantization number.

The gain calculation unit may select the number of meshes to be used for calculation of the gain such that the number of meshes to be used for calculation of the gain increases as the position of the audio object is positioned nearer to the audio object that is high in the importance degree.

The gain calculation unit may select, based on a sound pressure of the audio signal of the audio object, the number of meshes to be used for calculation of the gain, whether or not the quantization is to be performed and the quantization number.

The gain calculation unit may select, in response to a result of the selection of the number of meshes, three or more ones of the plurality of sound outputting units including the sound outputting units that are positioned at different heights from each other, and calculate the gain based on one or a plurality of meshes formed from the selected sound outputting units.

An audio processing method or a program according to the one aspect of the present technology includes the steps of acquiring metadata including position information indicative of a position of an audio object and sound image information configured from a vector of at least two or more dimensions and representative of an extent of a sound image from the position, calculating, based on a horizontal direction angle and a vertical direction angle of a region representative of the extent of the sound image determined by the sound image information, a spread vector indicative of a position in the region, and calculating, based on the spread vector, a gain of each of audio signals supplied to two or more sound outputting units positioned in the proximity of the position indicated by the position information.

In the one aspect of the present technology, metadata including position information indicative of an audio object and sound image information configured from a vector of at least two or more dimensions and representative of an extent of a sound image from the position is acquired. Then, based on a horizontal direction angle and a vertical direction angle regarding a region representative of the extent of the sound image determined by the sound image information, a spread vector indicative of a position in the region is calculated. Further, based on the spread vector, a gain of each of audio signals supplied to two or more sound outputting units positioned in the proximity of the position indicated by the position information is calculated.

Advantageous Effect of Invention

With the one aspect of the present technology, sound of higher quality can be obtained.

It is to be noted that the effect described here is not necessarily limitative, but any of effects described in the present disclosure may be exhibited.

DESCRIPTION OF EMBODIMENTS

In the following, embodiments to which the present technology is applied are described with reference to the drawings.

First Embodiment

<VBAP and Process for Extending Sound Image>

The present technology makes it possible, when an audio signal of an audio object and metadata such as position information of the audio object are acquired to perform rendering, to obtain sound of higher quality. It is to be noted that, in the following description, the audio object is referred to simply as object.

First, the VBAP and a process for extending a sound image in the MPEG-H 3D Audio standard are described below.

Figure 1:
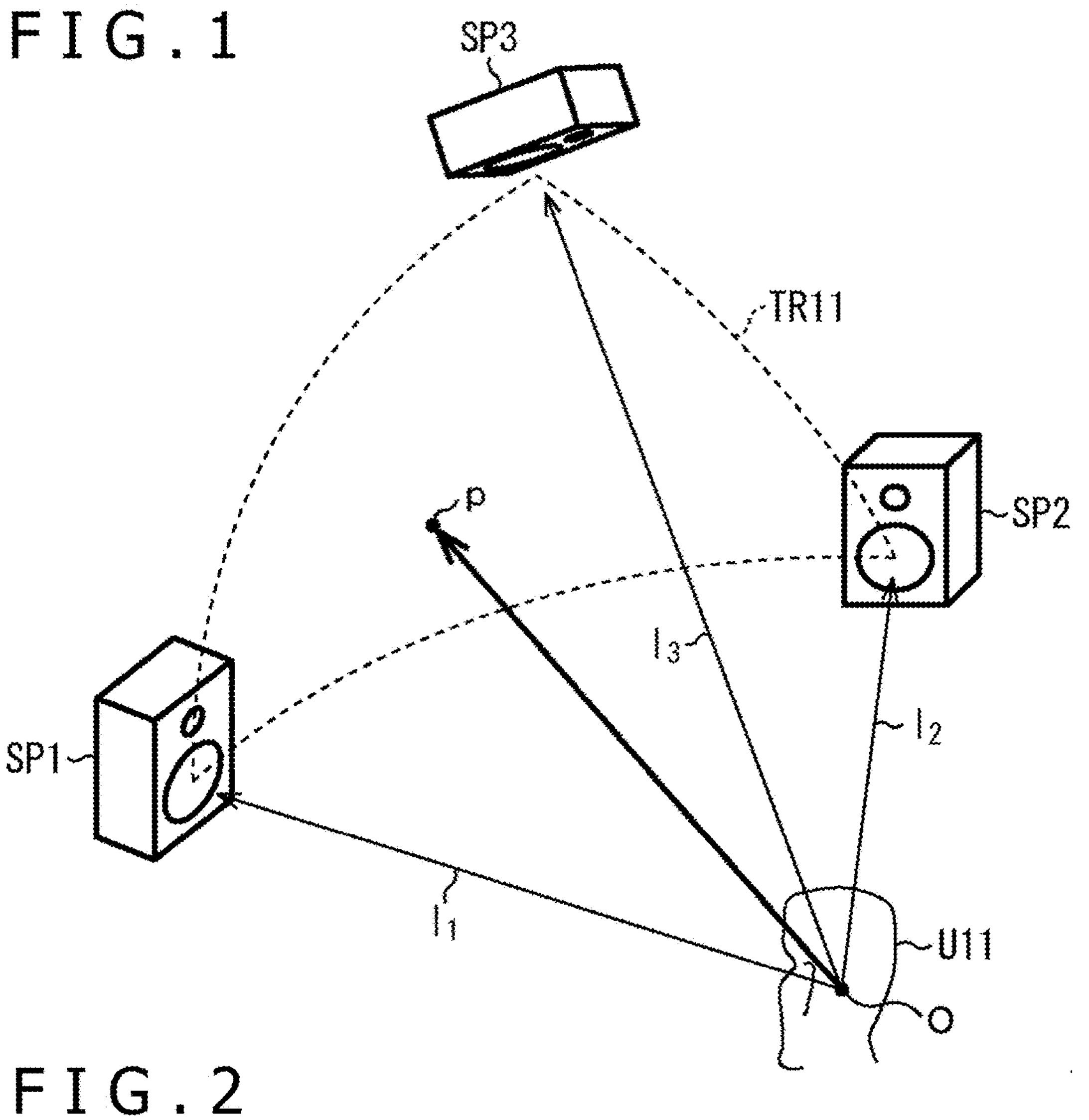
FIG. 1 is a view illustrating VBAP.

For example, it is assumed that, as depicted in FIG. 1, a user U11 who enjoys a content of a moving picture with sound, a musical piece or the like is listening to sound of three-channels outputted from three speakers SP1 to SP3 as sound of the content.

It is examined to localize, in such a case as just described, a sound image at a position p using information of the positions of the three speakers SP1 to SP3 that output sound of different channels.

For example, the position p is represented by a three-dimensional vector (hereinafter referred to also as vector p) whose start point is the origin O in a three-dimensional coordinate system whose origin O is given by the position of the head of the user U11. Further, if three-dimensional vectors whose start point is given by the origin O and that are directed in directions toward the positions of the speakers SP1 to SP3 are represented as vectors $I_1$ to $I_3$, respectively, then the vector p can be represented by a linear sum of the vectors $I_1$ to $I_3$.

In other words, the vector p can be represented as $p=g_1I_1+g_2I_2+g_3I_3$.

Here, if coefficients $g_1$ to $g_3$ by which the vectors $I_1$ to $I_3$ are multiplied are calculated and are determined as gains of sound outputted from the speakers SP1 to SP3, respectively, then a sound image can be localized at the position p.

A technique for determining the coefficients $g_1$ to $g_3$ using position information of the three speakers SP1 to SP3 and controlling the localization position of a sound image in such a manner as described above is referred to as three-dimensional VBAP. Especially, in the following description, a gain determined for each speaker like the coefficients $g_1$ to $g_3$ is referred to as VBAP gain.

In the example of FIG. 1, a sound image can be localized at an arbitrary position in a region TR11 of a triangular shape on a sphere including the positions of the speakers SP1, SP2 and SP3. Here, the region TR11 is a region on the surface of a sphere centered at the origin O and passing the positions of the speakers SP1 to SP3 and is a triangular region surrounded by the speakers SP1 to SP3.

If such three-dimensional VBAP is used, then a sound image can be localized at an arbitrary position in a space. It is to be noted that the VBAP is described in detail, for example, in 'Ville Pulkki, "Virtual Sound Source Positioning Using Vector Base Amplitude Panning," Journal of AES, vol. 45, no. 6, pp. 456-466, 1997' and so forth.

Now, a process for extending a sound image according to the MPEG-H 3D Audio standard is described.

In the MPEG-H 3D Audio standard, a bit stream obtained by multiplexing encoded audio data obtained by encoding an audio signal of each object and encoded metadata obtained by encoding metadata of each object is outputted from an encoding apparatus.

For example, the metadata includes position information indicative of a position of an object in a space, importance information indicative of an importance degree of the object and spread that is information indicative of a degree of extent of a sound image of the object.

Here, the spread indicative of an extent degree of a sound image is an arbitrary angle from 0 to 180 deg., and the encoding apparatus can designate spread of a value different for each frame of an audio signal in regard to each object.

Further, the position of the object is represented by a horizontal direction angle azimuth, a vertical direction angle elevation and a distance radius. In particular, the position information of the object is configured from values of the horizontal direction angle azimuth, vertical direction angle elevation and distance radius.

Figure 2:
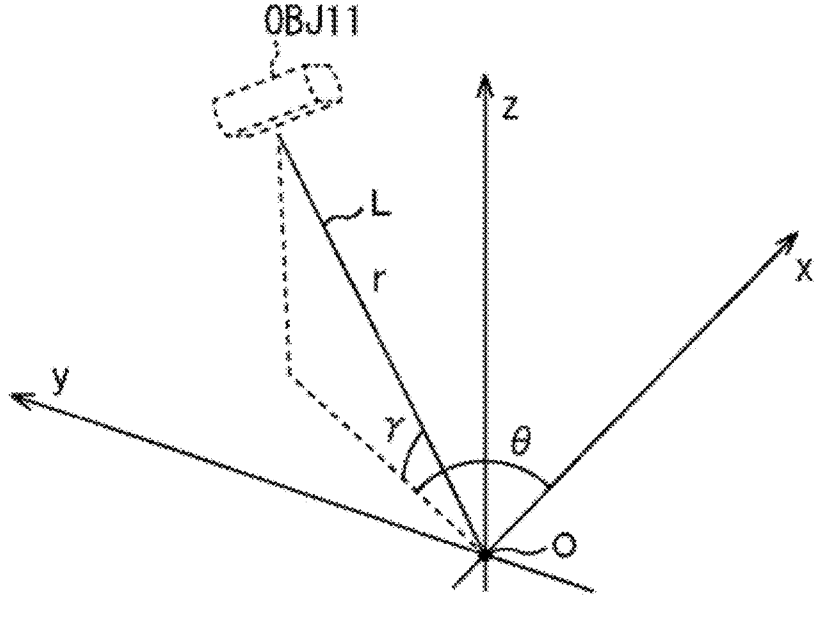
FIG. 2 is a view illustrating a position of a sound image.

For example, a three-dimensional coordinate system is considered in which, as depicted in FIG. 2, the position of a user who enjoys sound of objects outputted from speakers not depicted is determined as the origin O and a right upward direction, a left upward direction and an upward direction in FIG. 2 are determined as an x axis, a y axis and a z axis that are perpendicular to each other. At this time, if the position of one object is represented as position OBJ11, then a sound image may be localized at the position OBJ11 in the three-dimensional coordinate system.

Further, if a linear line interconnecting the position OBJ11 and the origin O is represented as line L, the angle θ (azimuth) in the horizontal direction in FIG. 2 defined by the linear line L and the x axis on the xy plane is a horizontal direction angle azimuth indicative of the position in the horizontal direction of the object at the position OBJ11, and the horizontal direction angle azimuth has an arbitrary value that satisfies −180 deg. ≤azimuth ≤180 deg.

For example, the positive direction in the x-axis direction is determined as azimuth=0 deg. and the negative direction in the x-axis direction is determined as azimuth=+180 deg. =−180 deg. Further, the counterclockwise direction around the origin O is determined as the + direction of the azimuth and the clockwise direction around the origin O is determined as the − direction of the azimuth.

Further, the angle defined by the linear line L and the xy plane, namely, the angle γ (elevation angle) in the vertical direction in FIG. 2, is the perpendicular direction angle elevation indicative of the position in the vertical direction of the object located at the position OBJ11, and the perpendicular direction angle elevation has an arbitrary value that satisfies −90 deg. ≤elevation ≤90 deg. For example, the position on the xy plane is elevation=0 deg. and the upward direction in FIG. 2 is the + direction of the perpendicular direction angle elevation, and the downward direction in FIG. 2 is the − direction of the perpendicular direction angle elevation.

Further, the length of the linear line L, namely, the distance from the origin O to the position OBJ11, is the distance radius to the user, and the distance radius has a value of 0 or more. In particular, the distance radius has a value that satisfies 0≤radius ≤∞. In the following description, the distance radius is referred to also as distance in a radial direction.

It is to be noted that, in the VBAP, the distance radii from all speakers or objects to the user are equal, and it is a general method that the distance radius is normalized to 1 to perform calculation.

The position information of the object included in the metadata in this manner is configured from values of the horizontal direction angle azimuth, vertical direction angle elevation and distance radius.

In the following description, the horizontal direction angle azimuth, vertical direction angle elevation and distance radius are referred to simply also as azimuth, elevation and radius, respectively.

Further, in a decoding apparatus that receives a bit stream including encoded audio data and encoded metadata, after decoding of the encoded audio data and the encoded metadata is performed, a rendering process for extending a sound image is performed in response to the value of the spread included in the metadata.

In particular, the decoding apparatus first determines a position in a space indicated by the position information included in the metadata of an object as position p. The position p corresponds to the position p in FIG. 1 described hereinabove.

Figure 3:
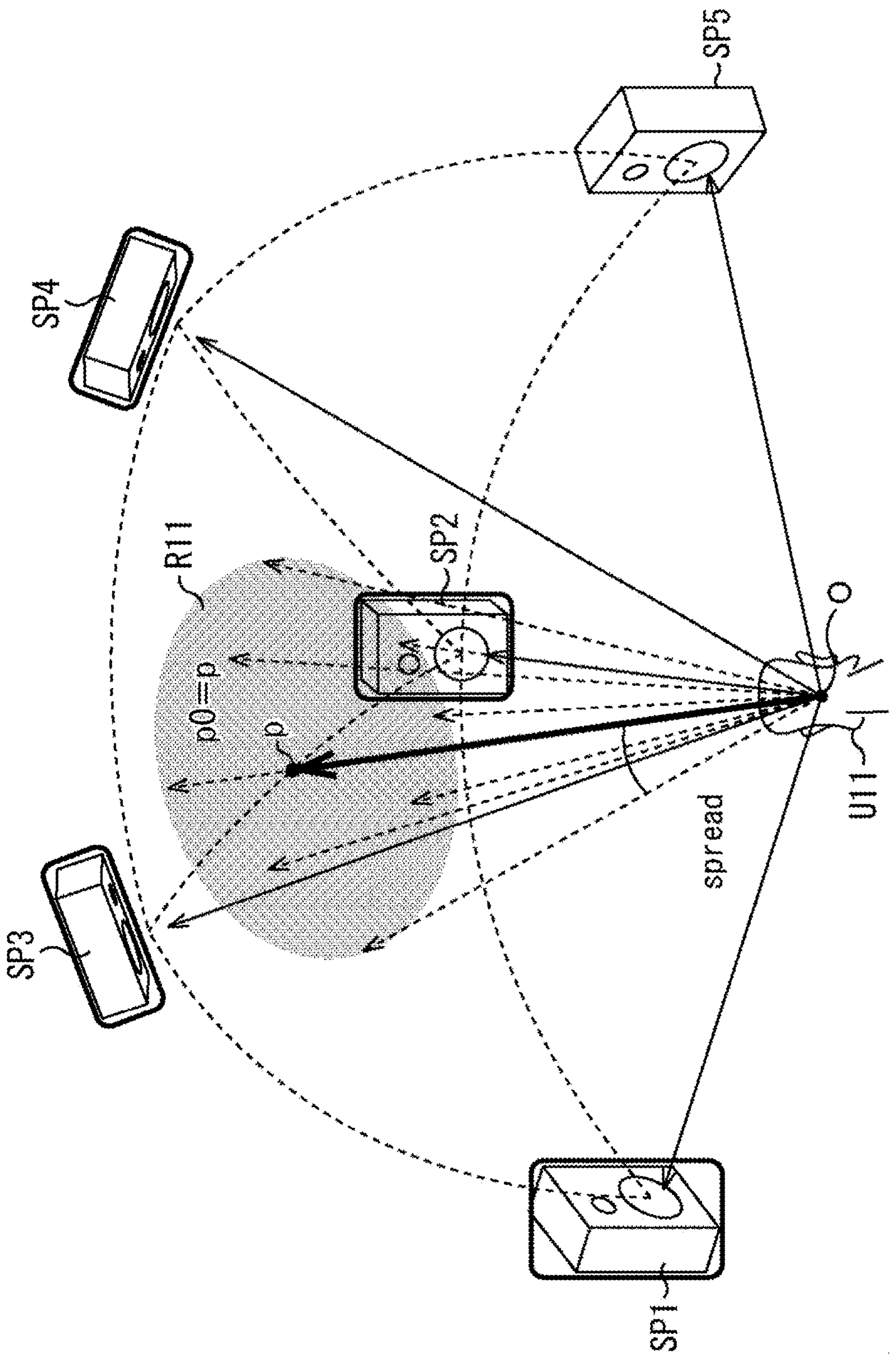
FIG. 3 is a view illustrating a spread vector.

Then, the decoding apparatus disposes 18 spread vectors p1 to p18 such that, setting the position p to position p=center position p0, for example, as depicted in FIG. 3, they are symmetrical in the upward and downward direction and the leftward and rightward direction on a unit spherical plane around the center position p0. It is to be noted that, in FIG. 3, portions corresponding to those in the case of FIG. 1 are denoted by like reference symbols, and description of the portions is omitted suitably.

In FIG. 3, five speakers SP1 to SP5 are disposed on a spherical plane of a unit sphere of a radius 1 centered at the origin O, and the position p indicated by the position information is the center position p0. In the following description, the position p is specifically referred to also as object position p and the vector whose start point is the origin O and whose end point is the object position p is referred to also as vector p. Further, the vector whose start point is the origin O and whose end point is the center position p0 is referred to also as vector p0.

In FIG. 3, an arrow mark whose start point is the origin O and which is plotted by a broken line represents a spread vector. However, while there actually are 18 spread vectors, in FIG. 3, only eight spread vectors are plotted for the visibility of FIG. 3.

Here, each of the spread vectors p1 to p18 is a vector whose end point position is positioned within a region R11 of a circle on a unit spherical plane centered at the center position p0. Especially, the angle defined by the spread vector whose end point position is positioned on the circumference of the circle represented by the region R11 and the vector p0 is an angle indicated by the spread.

Accordingly, the end point position of each spread vector is disposed at a position spaced farther from the center position p0 as the value of the spread increases. In other words, the region R11 increases in size.

The region R11 represents an extent of a sound image from the position of the object. In other words, the region R11 is a region indicative of the range in which a sound image of the object is extended. Further, it can be considered that, since it is considered that sound of the object is emitted from the entire object, the region R11 represents the shape of the object. In the following description, a region that indicates a range in which a sound image of an object is extended like the region R11 is referred to also as region indicative of extent of a sound image.

Further, where the value of the spread is 0, the end point positions of the 18 spread vectors p1 to p18 are equivalent to the center position p0.

It is to be noted that, in the following description, the end point positions of the spread vectors p1 to p18 are specifically referred to also as positions p1 to p18, respectively.

After the spread vectors symmetrical in the upward and downward direction and the leftward and rightward direction on the unit spherical plane are determined as described above, the decoding apparatus calculates a VBAP gain for each of the speakers of the channels by the VBAP in regard to the vector p and the spread vectors, namely, in regard to each of the position p and the positions p1 to p18. At this time, the VBAP gains for the speakers are calculated such that a sound image is localized at each of the positions such as the position p and a position p1.

Then, the decoding apparatus adds the VBAP gains calculated for the positions for each speaker. For example, in the example of FIG. 3, the VBAP gains for the position p calculated in regard to the speaker SP1 and the positions p1 to p18 are added.

Further, the decoding apparatus normalizes the VBAP gains after the addition process calculated for the individual speakers. In particular, normalization is performed such that the square sum of the VBAP gains of all speakers becomes 1.

Then, the decoding apparatus multiplies the audio signal of the object by the VBAP gains of the speakers obtained by the normalization to obtain audio signals for the individual speakers, and supplies the audio signals obtained for the individual speakers to the speakers such that they output sound.

Consequently, for example, in an example of FIG. 3, a sound image is localized such that sound is outputted from the entire region R11. In other words, the sound image is extended to the entire region R11.

In FIG. 3, when the process for extending a sound image is not performed, the sound image of the object is localized at the position p, and therefore, in this case, sound is outputted substantially from the speaker SP2 and the speaker SP3. In contrast, when the process for extending the sound image is performed, the sound image is extended to the entire region R11, and therefore, upon sound reproduction, sound is outputted from the speakers SP1 to SP4.

Incidentally, when such a process for extending a sound image as described above is performed, the processing amount upon rendering increases in comparison with that in an alternative case in which the process for extending a sound image is not performed. Consequently, a case occurs in which the number of objects capable of being handled by the decoding apparatus decreases, or another case occurs in which rendering cannot be performed by a decoding apparatus that incorporates a renderer of a small hardware scale.

Therefore, where a process for extending a sound image is performed upon rendering, it is desirable to make it possible to perform rendering with a processing amount as small as possible.

Further, since there is a constraint that the 18 spread vectors described above are symmetrical in the upward and downward direction and the leftward and rightward direction on the unit spherical plane around the center position p0=position p, a process taking the directionality (radiation direction) of sound of an object or the shape of an object into consideration cannot be performed. Therefore, sound of sufficiently high quality cannot be obtained.

Further, since, in the MPEG-H 3D Audio standard, one kind of a process is prescribed as a process for extending a sound image upon rendering, where the hardware scale of the renderer is small, the process for extending a sound image cannot be performed. In other words, reproduction of audio cannot be performed.

Further, in the MPEG-H 3D Audio standard, it cannot be performed to switch the processing to perform rendering such that sound having maximum quality can be obtained by a processing amount permitted with the hardware scale of the renderer.

Taking such a situation as described above into consideration, the present technology makes it possible to reduce the processing amount upon rendering. Further, the present technology makes it possible to obtain sound of sufficiently high quality by representing the directionality or the shape of an object. Furthermore, the present technology makes it possible to select an appropriate process as a process upon rendering in response to a hardware scale of a renderer or the like to obtain sound having the highest quality within a range of a permissible processing amount.

An outline of the present technology is described below.

<Reduction of Processing Amount>

First, reduction of the processing amount upon rendering is described.

In a normal VBAP process (rendering process) in which a sound image is not extended, processes A1 to A3 particularly described below are performed:

(Process A1)

VBAP gains by which an audio signal is to be multiplied are calculated in regard to three speakers.

(Process A2)

Normalization is performed such that the square sum of the VBAP gains of the three speakers becomes 1.

(Process A3)

An audio signal of an object is multiplied by the VBAP gains.

Here, since, in the process A3, a multiplication process of an audio signal by a VBAP gain is performed for each of the three speakers, such a multiplication process as just described is performed by three times in the maximum.

On the other hand, in a VBAP process (rendering process) when a process for extending a sound image is performed, processes B1 to B5 particularly described below are performed:

(Process B1)

A VBAP gain by which an audio signal of each of the three speakers is to be multiplied is calculated in regard to the vector p.

(Process B2)

A VBAP gain by which an audio signal of each of the three speakers is to be multiplied is calculated in regard to 18 spread vectors.

(Process B3)

The VBAP gains calculated for the vectors are added for each speaker.

(Process B4)

Normalization is performed such that the square sum of the VBAP gains of all speakers becomes 1.

(Process B5)

The audio signal of the object is multiplied by the VBAP gains.

When the process for extending a sound image is performed, since the number of speakers that output sound is three or more, the multiplication process in the process B5 is performed by three times or more.

Accordingly, if a case in which the process for extending a sound image is performed and another case in which the process for extending a sound image is not performed are compared with each other, then when the process for extending a sound image is performed, the processing amount increases by an amount especially by the processes B2 and B3 and the processing amount also in the process B5 is greater than that in the process A3.

Therefore, the present technology makes it possible to reduce the processing amount in the process B5 described above by quantizing the sum of the VBAP gains of the vectors determined for each speaker.

In particular, such a process as described below is performed by the present technology. It is to be noted that the sum (addition value) of the VBAP gains calculated for each vector such as a vector p or a spread vector determined for each speaker is referred to also as VBAP gain addition value.

First, after the processes B1 to B3 are performed and a VBAP gain addition value is obtained for each speaker, then the VBAP gain addition value is binarized. In the binarization, for example, the VBAP gain addition value for each speaker has one of 0 and 1.

As a method for binarizing a VBAP gain addition value, any method may be adopted such as rounding off, ceiling (round up), flooring (truncation) or a threshold value process.

After the VBAP gain addition value is binarized in this manner, the process B4 described above is performed on the basis of the binarized VBAP gain addition value. Then, as a result, the final VBAP gain for each speaker is one gain except 0. In other words, if the VBAP gain addition value is binarized, then the final value of the VBAP gain of each speaker is 0 or a predetermined value.

For example, if, as a result of the binarization, the VBAP gain addition value of the three speakers is 1 and the VBAP gain addition value of the other speakers is 0, then the final value of the VBAP gain of the three speakers is $1/3^{(1/2)}$.

After the final VBAP gains for the speakers are obtained in this manner, a process for multiplying the audio signals for the speakers by the final VBAP gains is performed as a process B5' in place of the process B5 described hereinabove.

If binarization is performed in such a manner as described above, then since the final value of the VBAP gain for each speaker becomes one of 0 and the predetermined value, in the process B5', it is necessary to perform the multiplication process only once, and therefore, the processing amount can be reduced. In other words, while the process B5 requires performance of a multiplication process three times or more, the process B5' requires performance of a multiplication process only once.

It is to be noted that, although the description here is given of a case in which a VBAP gain addition value is binarized as an example, the VBAP gain addition value may be quantized otherwise into one of three values or more.

For example, where a VBAP gain addition value is one of three values, after the processes B1 to B3 described above are performed and a VBAP gain addition value is obtained for each speaker, the VBAP gain addition value is quantized into one of 0, 0.5 and 1. After then, the process B4 and the process B5' are performed. In this case, the number of times of a multiplication process in the process B5' is two in the maximum.

Where a VBAP gain addition value is x-value converted in this manner, namely, where a VBAP gain addition value is quantized into one of x gains where x is equal to or greater than 2, then the number of times of performance of a multiplication process in the process B5' becomes (x−1) in the maximum.

It is to be noted that, although, in the foregoing description, an example in which, when a process for extending a sound image is performed, a VBAP gain addition value is quantized to reduce the processing amount is described, also where a process for extending a sound image is not performed, the processing amount can be reduced by quantizing a VBAP gain similarly. In particular, if the VBAP gain for each speaker determined in regard to the vector p is quantized, then the number of times of performance of a multiplication process for an audio signal by the VBAP gain after normalization can be reduced.

<Process for Representing Shape and Directionality of Sound of Object>

Now, a process for representing a shape of an object and a directionality of sound of the object by the present technology is described.

In the following, five methods including a spread three-dimensional vector method, a spread center vector method, a spread end vector method, a spread radiation vector method and an arbitrary spread vector method are described.

(Spread Three-Dimensional Vector Method)

First, the spread three-dimensional vector method is described.

In the spread three-dimensional vector method, a spread three-dimensional vector that is a three-dimensional vector is stored into and transmitted together with a bit stream. Here, it is assumed that a spread three-dimensional vector is stored, for example, into metadata of a frame of each audio signal for each object. In this case, a spread indicative of an extent degree of a sound image is not stored in the metadata.

For example, a spread three-dimensional vector is a three-dimensional vector including three factors of s3_azimuth indicative of an extent degree of a sound image in the horizontal direction, s3_elevation indicative of an extent degree of the sound image in the vertical direction and s3_radius indicative of a depth in a radius direction of the sound image.

In particular, the spread three-dimensional vector=(s3_azimuth, s3_elevation, s3_radius).

Here, s3_azimuth indicates a spread angle of a sound image in the horizontal direction from the position p, namely, in a direction of the horizontal direction angle azimuth described hereinabove. In particular, s3_azimuth indicates an angle defined by a vector toward an end in the horizontal direction side of a region that indicates an extent of a sound image from the origin O and the vector p (vector pO).

Similarly, s3_elevation indicates a spread angle of a sound image in the vertical direction from the position p, namely, in the direction of the vertical direction angle elevation described hereinabove. In particular, s3_elevation indicates an angle defined between a vector toward an end in the vertical direction side of a region indicative of an extent of the sound image from the origin O and the vector p (vector pO). Further, s3_radius indicates a depth in the direction of the distance radius described above, namely, in a normal direction to the unit spherical plane.

It is to be noted that s3_azimuth, s3_elevation and s3_radius have values equal to or greater than 0. Further, although the spread three-dimensional vector here is information indicative of a relative position to the position p indicated by the position information of the object, the spread three-dimensional vector may otherwise be information indicative of an absolute position.

In the spread three-dimensional vector method, such a spread three-dimensional vector as described above is used to perform rendering.

In particular, in the spread three-dimensional vector method, a value of the spread is calculated by calculating the expression (1) given below on the basis of a spread three-dimensional vector:

[Expression 1]

$$\text{spread:}\max(s3\_\text{azimuth},s3\_\text{elevation}) \quad (1)$$

It is to be noted that max(a, b) in the expression (1) indicates a function that returns a higher one of values of a and b. Accordingly, a higher value of s3_azimuth and s3_elevation is determined as the value of the spread.

Then, on the basis of the value of the spread obtained in this manner and position information included in the metadata, 18 spread vectors p1 to p18 are calculated similarly as in the case of the MPEG-H 3D Audio standard.

Accordingly, the position p of the object indicated by the position information included in the metadata is determined as center position pO, and the 18 spread vectors p1 to p18 are determined such that they are symmetrical in the leftward and rightward direction and the upward and downward direction on the unit spherical plane centered at the center position pO.

Further, in the spread three-dimensional vector method, the vector pO whose start point is the origin O and whose end point is the center position pO is determined as spread vector p0.

Further, each spread vector is represented by a horizontal direction angle azimuth, a vertical direction angle elevation and a distance radius. In the following, the horizontal direction angle azimuth and the vertical direction angle elevation particularly of the spread vector pi (where i=0 to 18) are resented as a(i) and e(i), respectively.

After the spread vectors p0 to p18 are obtained in this manner, the spread vectors p1 to p18 are changed (corrected) into final spread vectors on the basis of the ratio between s3_azimuth and s3_elevation.

In particular, where s3_azimuth is greater than s3_elevation, calculation of the following expression (2) is performed to change e(i), which is elevation of the spread vectors p1 to p18, into e'(i):

[Expression 2]

$$e'(i)=e(0)+(e(i)-e(0))\times s3\_\text{elevation}/s3\_\text{azimuth} \quad (2)$$

It is to be noted that, for the spread vector p0, correction of elevation is not performed.

In contrast, where s3_azimuth is smaller than s3_elevation, calculation of the following expression (3) is performed to change a(i), which is azimuth of the spread vectors p1 to p18, into a'(i):

[Expression 3]

$$a'(i)=a(0)+(a(i)-a(0))\times s3\_\text{azimuth}/s3\_\text{elevation} \quad (3)$$

It is to be noted that, for the spread vector p0, correction of azimuth is not performed.

The process of determining a greater one of s3_azimuth and s3_elevation as a spread to determine a spread vector in such a manner as described above is a process for tentatively setting a region indicative of an extent of a sound image on the unit spherical plane as a circle of a radius defined by an angle of a greater one of s3_azimuth and s3_elevation to determine a spread vector by a process similar to a conventional process.

Further, the process of correcting the spread vector later by the expression (2) or the expression (3) in response to a relationship in magnitude between s3_azimuth and s3_elevation is a process for correcting the region indicative of the extent of the sound image, namely, the spread vector, such that the region indicative of the extent of the sound image on the unit spherical plane becomes a region defined by original s3_azimuth and s3_elevation designated by the spread three-dimensional vector.

Accordingly, the processes described above after all become processes for calculating a spread vector for a region indicative of an extent of a sound image, which has a circular shape or an elliptical shape, on the unit spherical plane on the basis of the spread three-dimensional vector, namely, on the basis of s3_azimuth and s3 elevation.

After the spread vectors are obtained in this manner, the spread vectors p0 to p18 are thereafter used to perform the process B2, the process B3, the process B4 and the process B5' described hereinabove to generate audio signals to be supplied to the speakers.

It is to be noted that, in the process B2, a VBAP gain for each speaker is calculated in regard to each of the 19 spread vectors of the spread vectors p0 to p18. Here, since the spread vector p0 is the vector p, it can be considered that the process for calculating the VBAP gain in regard to the spread vector p0 is to perform the process B1. Further, after the process B3, quantization of each VBAP gain addition value is performed as occasion demands.

By setting a region indicative of an extent of a sound image to a region of an arbitrary shape by spread three-dimensional vectors in this manner, it becomes possible to represent a shape of an object and a directionality of sound of the object, and sound of higher quality can be obtained by rendering.

Further, although an example in which a higher one of values of s3_azimuth and s3_elevation is used as a value of the spread is described here, otherwise a lower one of values of s3_azimuth and s3_elevation may be used as a value of the spread.

In this case, when s3_azimuth is greater than s3_elevation, a(i) that is azimuth of each spread vector is corrected, but when s3_azimuth is smaller than s3_elevation, e(i) that is elevation of each spread vector is corrected.

Further, although description here is given of an example in which the spread vectors p0 to p18, namely, the 19 spread vectors determined in advance, are determined and a VBAP gain is calculated in regard to the spread vectors, the number of spread vectors to be calculated may be variable.

In such a case as just described, the number of spread vectors to be generated can be determined, for example, in response to the ratio between s3_azimuth and s3_elevation. According to such a process as just described, for example, where an object is elongated horizontally and the extent of sound of the object in the vertical direction is small, if the spread vectors juxtaposed in the vertical direction are omitted and the spread vectors are juxtaposed substantially in the horizontal direction, then the extent of sound in the horizontal direction can be represented appropriately.

(Spread Center Vector Method)

Now, the spread center vector method is described.

In the spread center vector method, a spread center vector that is a three-dimensional vector is stored into and transmitted together with a bit stream. Here, it is assumed that a spread center vector is stored, for example, into metadata of a frame of each audio signal for each object. In this case, also a spread indicative of an extent degree of a sound image is stored in the metadata.

The spread center vector is a vector indicative of the center position pO of a region indicative of an extent of a sound image of an object. For example, the spread center vector is a three-dimensional vector configured form three factors of azimuth indicative of a horizontal direction angle of the center position pO, elevation indicative of a vertical direction angle of the center position pO and radius indicative of a distance of the center position pO in a radial direction.

In particular, the spread center vector=(azimuth, elevation, radius).

Figure 4:
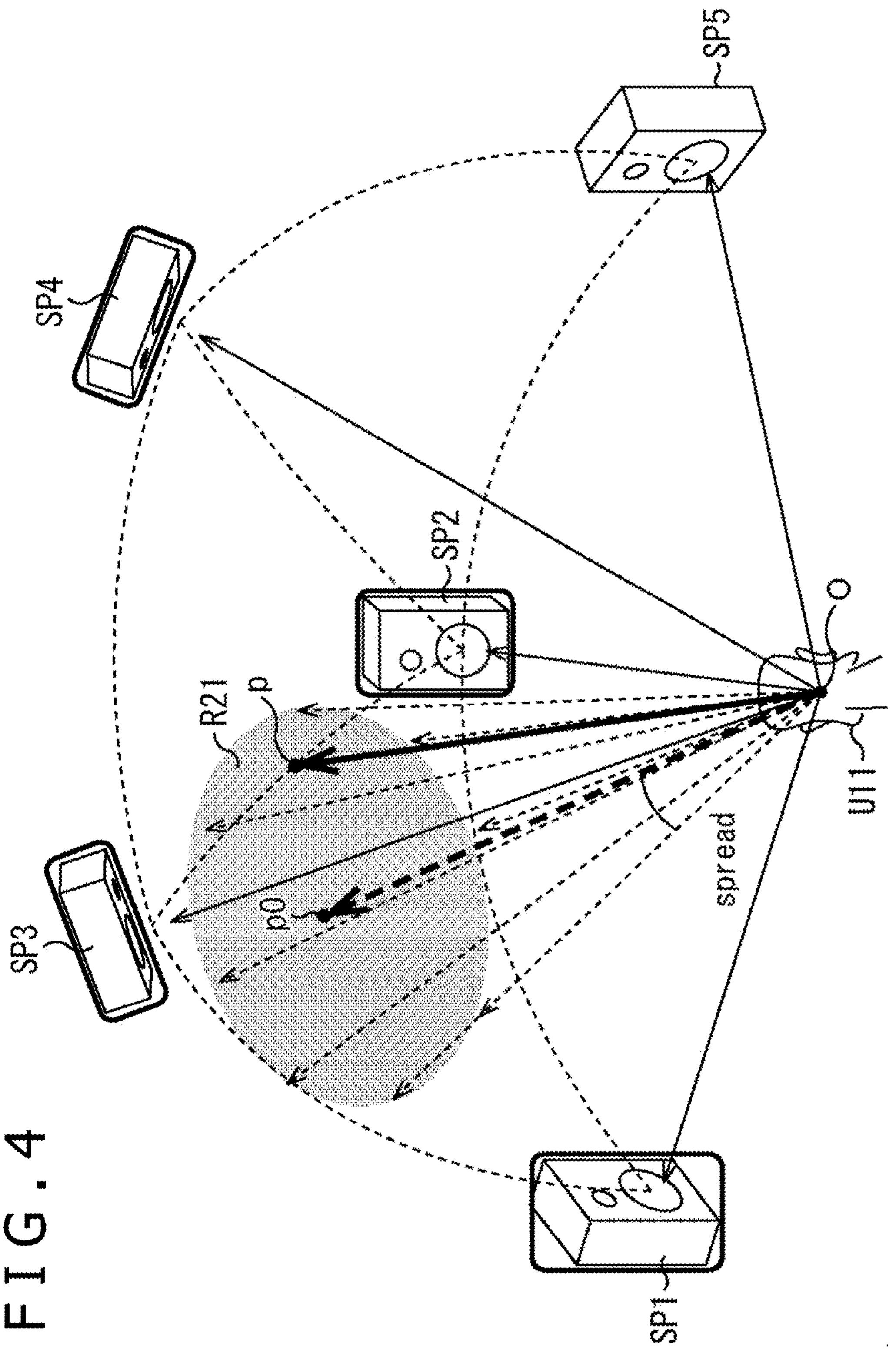
FIG. 4 is a view illustrating a spread center vector method.

Upon rendering processing, the position indicated by the spread center vector is determined as the center position pO, and spread vectors p0 to p18 are calculated as spread vectors. Here, for example, as depicted in FIG. 4, the spread vector p0 is the vector pO whose start point is the origin O and whose end point is the center position pO. It is to be noted that, in FIG. 4, portions corresponding to those in the case of FIG. 3 are denoted by like reference symbols and description of them is omitted suitably.

Further, in FIG. 4, an arrow mark plotted by a broken line represents a spread vector, and also in FIG. 4, in order to make the figure easy to see, only nine spread vectors are depicted.

While, in the example depicted in FIG. 3, the position p=center position pO, in the example of FIG. 4, the center position pO is a position different from the position p. In this example, it can be seen that a region R21 indicative of an extent of a sound image and centered at the center position pO is displaced to the left side in FIG. 4 from that in the example of FIG. 3 with respect to the position p that is the position of the object.

If it is possible to designate, as the center position pO of the region indicative of an extent of a sound image, an arbitrary position by a spread center vector in this manner, then the directionality of sound of the object can be represented with a higher degree of accuracy.

In the spread center vector method, if the spread vectors p0 to p18 are obtained, then the process B1 is performed thereafter for the vector p and the process B2 is performed in regard to the spread vectors p0 to p18.

It is to be noted that, in the process B2, a VBAP gain may be calculated in regard to each of the 19 spread vectors, or a VBAP gain may be calculated only in regard to the spread vectors p1 to p18 except the spread vector p0. In the following, description is given assuming that a VBAP gain is calculated also in regard to the spread vector p0.

Further, after the VBAP gain of each vector is calculated, the process B3, process B4 and process B5' are performed to generate audio signals to be supplied to the speakers. It is to be noted that, after the process B3, quantization of a VBAP gain addition value is performed as occasion demands.

Also by such a spread center vector method as described above, sound of sufficiently high quality can be obtained by rendering.

(Spread End Vector Method)

Now, the spread end vector method is described.

In the spread end vector method, a spread end vector that is a five-dimensional vector is stored into and transmitted together with a bit stream. Here, it is assumed that, for example, a spread end vector is stored into metadata of a frame of each audio signal for each object. In this case, a spread indicative of an extent degree of a sound image is not stored into the metadata.

For example, a spread end vector is a vector representative of a region indicative of an extent of a sound image of an object, and is a vector configured from five factors of a spread left end azimuth, a spread right end azimuth, a spread upper end elevation, a spread lower end elevation and a spread radius.

Here, the spread left end azimuth and the spread right end azimuth configuring the spread end vector individually indicate values of horizontal direction angles azimuth indicative of absolute positions of a left end and a right end in the horizontal direction of the region indicative of the extent of the sound image. In other words, the spread left end azimuth and the spread right end azimuth individually indicate angles representative of extent degrees of a sound image in the leftward direction and the rightward direction from the center position pO of the region indicative of the extent of the sound image.

Meanwhile, the spread upper end elevation and the spread lower end elevation individually indicate values of vertical direction angles elevation indicative of absolute positions of an upper end and a lower end in the vertical direction of the region indicative of the extent of the sound image. In other words, the spread upper end elevation and the spread lower end elevation individually indicate angles representative of extent degrees of a sound image in the upward direction and the downward direction from the center position pO of the region indicative of the extent of the sound image. Further, spread radium indicates a depth of the sound image in a radial direction.

It is to be noted that, while the spread end vector here is information indicative of an absolute position in the space, the spread end vector may otherwise be information indicative of a relative position to the position p indicated by the position information of the object.

In the spread end vector method, rendering is performed using such a spread end vector as described above.

In particular, in the spread end vector method, the following expression (4) is calculated on the basis of a spread end vector to calculate the center position pO:

[Expression 4]

$$\text{azimuth:(spread left end azimuth+spread right end azimuth)/2}$$

$$\text{elevation:(spread upper end elevation+spread lower end elevation)/2}$$

$$\text{radius:spread radius} \quad (4)$$

In particular, the horizontal direction angle azimuth indicative of the center position pO is a middle (average) angle between the spread left end azimuth and the spread right end azimuth, and the vertical direction angle elevation indicative of the center position pO is a middle (average) angle between the spread upper end elevation and the spread lower end elevation. Further, the distance radius indicative of the center position pO is spread radius.

Accordingly, in the spread end vector method, the center position pO sometimes becomes a position different from the position p of an object indicated by the position information.

Further, in the spread end vector method, the value of the spread is calculated by calculating the following expression (5):

[Expression 5]

$$\text{spread:max((spread left end azimuth−spread right end azimuth)/2, (spread upper end elevation−spread lower end elevation)/2)} \quad (5)$$

It is to be noted that max(a, b) in the expression (5) indicates a function that returns a higher one of values of a and b. Accordingly, a higher one of values of (spread left end azimuth−spread right end azimuth)/2 that is an angle corresponding to the radius in the horizontal direction and (spread upper end elevation−spread lower end elevation)/2 that is an angle corresponding to the radius in the vertical direction in the region indicative of the extent of the sound image of the object indicated by the spread end vector is determined as the value of the spread.

Then, on the basis of the value of the spread obtained in this manner and the center position pO (vector pO), the 18 spread vectors p1 to p18 are calculated similarly as in the case of the MPEG-H 3D Audio standard.

Accordingly, the 18 spread vectors p1 to p18 are determined such that they are symmetrical in the upward and downward direction and the leftward and rightward direction on the unit spherical plane centered at the center position pO.

Further, in the spread end vector method, the vector pO whose start point is the origin O and whose end point is the center position pO is determined as spread vector p0.

Also in the spread end vector method, similarly as in the case of the spread three-dimensional vector method, each spread vector is represented by a horizontal direction angle azimuth, a vertical direction angle elevation and a distance radius. In other words, the horizontal direction angle azimuth and the vertical direction angle elevation of a spread vector pi (where i=0 to 18) are represented by a(i) and e(i), respectively.

After the spread vectors p0 to p18 are obtained in this manner, the spread vectors p1 to p18 are changed (corrected) on the basis of the ratio between the (spread left end azimuth−spread right end azimuth) and the (spread upper end elevation−spread lower end elevation) to determine final spread vectors.

In particular, if the (spread left end azimuth −spread right end azimuth) is greater than the (spread upper end elevation −spread lower end elevation), then calculation of the expression (6) given below is performed and e(i) that is elevation of each of the spread vectors p1 to p18 is changed to e'(i):

[Expression 6]

$$e'(i)=e(0)+(e(i)-e(0))\times(\text{spread upper end elevation}-\text{spread lower end elevation})/(\text{spread left end azimuth}-\text{spread right end azimuth}) \quad (6)$$

It is to be noted that, for the spread vector p0, correction of elevation is not performed.

On the other hand, when the (spread left end azimuth−spread right end azimuth) is smaller than the (spread upper end elevation−spread lower end elevation), calculation of the expression (7) given below is performed and a(i) that is azimuth of each of the spread vectors p1 to p18 is changed to a'(i):

[Expression 7]

$$a'(i)=a(0)+(a(i)-a(0))\times(\text{spread left end azimuth}-\text{spread right end azimuth})/(\text{spread upper end elevation}-\text{spread lower end elevation}) \quad (7)$$

It is to be noted that, for the spread vector p0, correction of azimuth is not performed.

It is to be noted that the calculation method of a spread vector as described above is basically similar to that in the case of the spread three-dimensional vector method.

Accordingly, the processes described above after all are processes for calculating, on the basis of the spread end vector, a spread vector for a region indicative of an extent of a sound image of a circular shape or an elliptical shape on a unit spherical plane defined by the spread end vector.

After spread vectors are obtained in this manner, the vector p and the spread vectors p0 to p18 are used to perform the process B1, the process B2, the process B3, the process B4 and the process B5' described hereinabove, thereby generating audio signals to be supplied to the speakers.

It is to be noted that, in the process B2, a VBAP gain for each speaker is calculated in regard to the 19 spread vectors. Further, after the process B3, quantization of VBAP gain addition values is performed as occasion demands.

By setting a region indicative of an extent of a sound image to a region of an arbitrary shape, which has the center position pO at an arbitrary position, by a spread end vector in this manner, it becomes possible to represent a shape of an object and a directionality of sound of the object, and sound of higher quality can be obtained by rendering.

Further, while an example in which a higher one of values of the (spread left end azimuth−spread right end azimuth)/2 and the (spread upper end elevation−spread lower end elevation)/2 is used as the value of the spread is described here, a lower one of the values may otherwise be used as the value of the spread.

Furthermore, although the case in which a VBAP gain is calculated in regard to the spread vector p0 is described as an example here, the VBAP gain may not be calculated in regard to the spread vector p0. The following description is given assuming that a VBAP gain is calculated also in regard to the spread vector p0.

Alternatively, similarly as in the case of the spread three-dimensional vector method, the number of spread vectors to be generated may be determined, for example, in response to the ratio between the (spread left end azimuth−spread right end azimuth) and the (spread upper end elevation−spread lower end elevation).

(Spread Radiation Vector Method)

Further, the spread radiation vector method is described.

In the spread radiation vector method, a spread radiation vector that is a three-dimensional vector is stored into and transmitted together with a bit stream. Here, it is assumed that, for example, a spread radiation vector is stored into metadata of a frame of each audio signal for each object. In this case, also the spread indicative of an extent degree of a sound image is stored in the metadata.

The spread radiation vector is a vector indicative of a relative position of the center position pO of a region indicative of an extent of a sound image of an object to the position p of the object. For example, the spread radiation vector is a three-dimensional vector configured from three factors of azimuth indicative of a horizontal direction angle to the center position pO, elevation indicative of a vertical direction angle to the center position pO and radius indicative of a distance in a radial direction of the center position pO, as viewed from the position p.

In other words, the spread radiation vector=(azimuth, elevation, radius).

Figure 5:
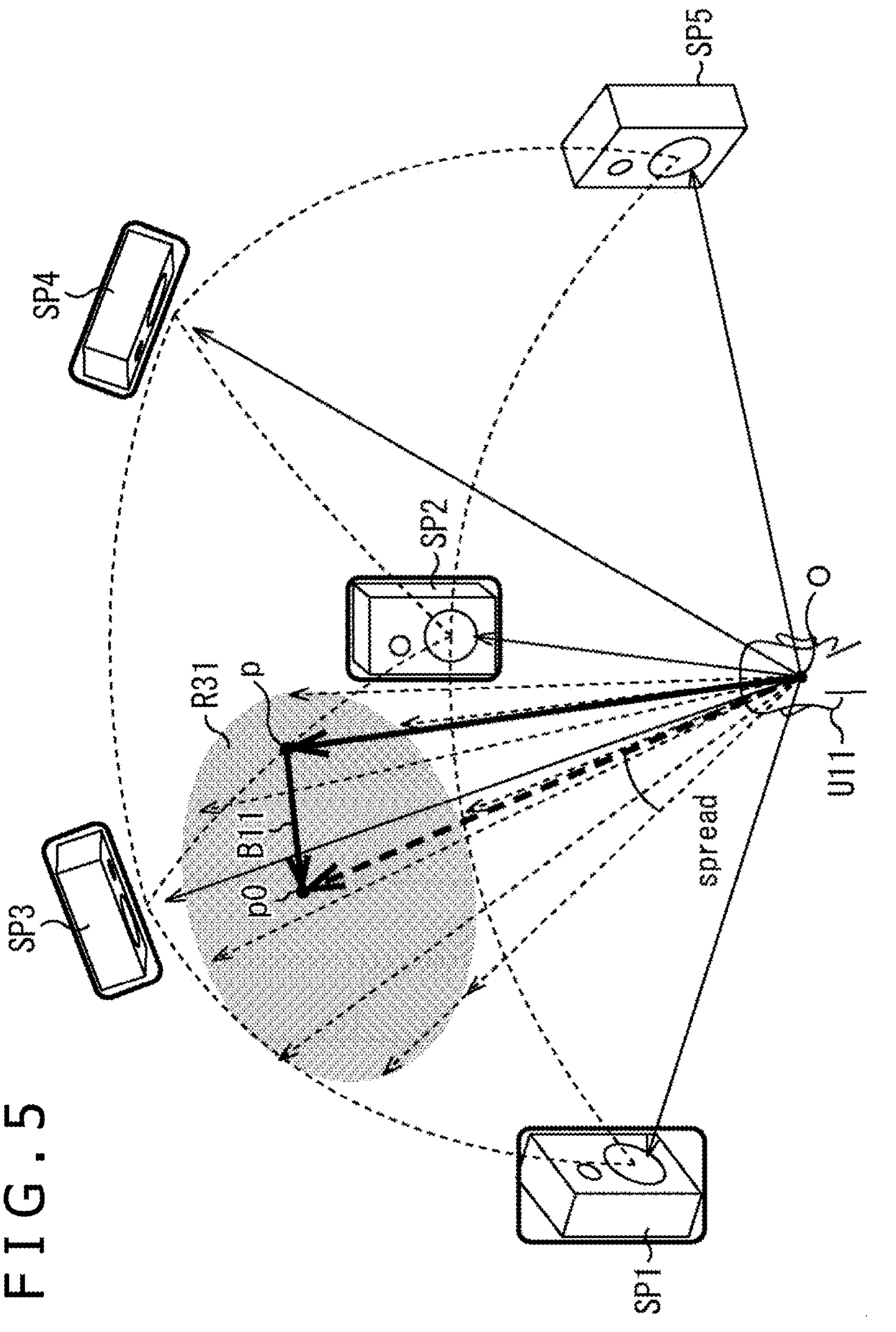
FIG. 5 is a view illustrating a spread radiation vector method.

Upon rendering processing, a position indicated by a vector obtained by adding the spread radiation vector and the vector p is determined as the center position pO, and as the spread vector, the spread vectors p0 to p18 are calculated. Here, for example, as depicted in FIG. 5, the spread vector p0 is the vector pO whose start point is the origin O and whose end point is the center position pO. It is to be noted that, in FIG. 5, portions corresponding to those in the case of FIG. 3 are denoted by like reference symbols, and description of the portions is omitted suitably.

Further, in FIG. 5, an arrow mark plotted by a broken line represents a spread vector, and also in FIG. 5, in order to make the figure easy to see, only nine spread vectors are depicted.

While, in the example depicted in FIG. 3, the position p=center position pO, in the example depicted in FIG. 5, the center position pO is a position different from the position p. In this example, the end point position of a vector obtained by vector addition of the vector p and the spread radiation vector indicated by an arrow mark B11 is the center position pO.

Further, it can be recognized that a region R31 indicative of an extent of a sound image and centered at the center position pO is displaced to the left side in FIG. 5 more than that in the example of FIG. 3 with respect to the position p that is a position of the object.

If it is made possible to designate, as the center position pO of the region indicative of an extent of a sound image, an arbitrary position using the spread radiation vector and the position p in this manner, then the directionality of sound of the object can be represented more accurately.

In the spread radiation vector method, if the spread vectors p0 to p18 are obtained, then the process B1 is thereafter performed for the vector p and the process B2 is performed for the spread vectors p0 to p18.

It is to be noted that, in the process B2, a VBAP gain may be calculated in regard to the 19 spread vectors or a VBAP gain may be calculated only in regard to the spread vectors p1 to p18 except the spread vector p0. In the following description, it is assumed that a VBAP gain is calculated also in regard to the spread vector p0.

Further, if a VBAP gain for each vector is calculated, then the process B3, the process B4 and the process B5' are performed to generate audio signals to be supplied to the speakers. It is to be noted that, after the process B3, quantization of each VBAP gain addition value is performed as occasion demands.

Also with such a spread radiation vector method as described above, sound of sufficiently high quality can be obtained by rendering.

(Arbitrary Spread Vector Method)

Subsequently, the arbitrary spread vector method is described.

In the arbitrary spread vector method, spread vector number information indicative of the number of spread vectors for calculating a VBAP gain and spread vector position information indicative of the end point position of each spread vector are stored into and transmitted together with a bit stream. Here, it is assumed that spread vector number information and spread vector position information are stored, for example, into metadata of a frame of each audio signal for each object. In this case, the spread indicative of an extent degree of a sound image is not stored into the metadata.

Upon rendering processing, on the basis of each piece of spread vector position information, a vector whose start point is the origin O and whose end point is a position indicated by the spread vector position information is calculated as spread vector.

Thereafter, the process B1 is performed in regard to the vector p and the process B2 is performed in regard to each spread vector. Further, after a VBAP gain for each vector is calculated, the process B3, the process B4 and the process B5' are performed to generate audio signals to be supplied to the speakers. It is to be noted that, after the process B3, quantization of each VBAP gain addition value is performed as occasion demands.

According to such an arbitrary spread vector method as described above, it is possible to designate a range to which a sound image is to be extended and a shape of the range arbitrarily, and therefore, sound of sufficiently high quality can be obtained by rendering.

<Switching of Process>

In the present technology, it is made possible to select an appropriate process as a process upon rendering in response to a hardware scale of a renderer and so forth and obtain sound of the highest quality within a range of a permissible processing amount.

In particular, in the present technology, in order to make it possible to perform switching between a plurality of processes, an index for switching a process is stored into and transmitted together with a bit stream from an encoding apparatus to a decoding apparatus. In other words, an index value index for switching a process is added to a bit stream syntax.

For example, the following process is performed in response to the value of the index value index.

In particular, when the index value index=0, a decoding apparatus, more particularly, a renderer in a decoding apparatus, performs rendering similar to that in the case of the conventional MPEG-H 3D Audio standard.

On the other hand, for example, when the index value index=1, from among combinations of indexes indicative of 18 spread vectors according to the conventional MPEG-H 3D Audio standard, indexes of a predetermined combination are stored into and transmitted together with a bit stream. In this case, the renderer calculates a VBAP gain in regard to a spread vector indicated by each index stored in and transmitted together with the bit stream.

Further, for example, when the index value index=2, information indicative of the number of spread vectors to be used in processing and an index indicative of which one of the 18 spread vectors according to the conventional MPEG-H 3D Audio standard is indicated by a spread vector to be used for processing are stored into and transmitted together with a bit stream.

Further, for example, when the index value index=3, a rendering process is performed in accordance with the arbitrary spread vector method described above, and for example, when the index value index=4, binarization of a VBAP gain addition value described above is performed in the rendering process. Further, for example, when the index value index=5, a rendering process is performed in accordance with the spread center vector method described hereinabove.

Further, the index value index for switching a process in the encoding apparatus may not be designated, but a process may be selected by the renderer in the decoding apparatus.

In such a case as just described, for example, it seems a recommendable idea to switch the process on the basis of importance information included in the metadata of an object. In particular, for example, for an object whose importance degree indicated by the importance information is high (equal to or higher than a predetermined value), the process indicated by the index value index=0 described above is performed. For an object whose importance degree indicated by the importance information is low (lower than the predetermined value), the process indicated by the index value index=4 described hereinabove can be performed.

By switching a process upon rendering suitably in this manner, sound of the highest quality within a range of a permissible processing amount can be obtained in response to a hardware scale or the like of the renderer.

Example of Configuration of Audio Processing Apparatus

Subsequently, a more particular embodiment of the present technology described above is described.

Figure 6:
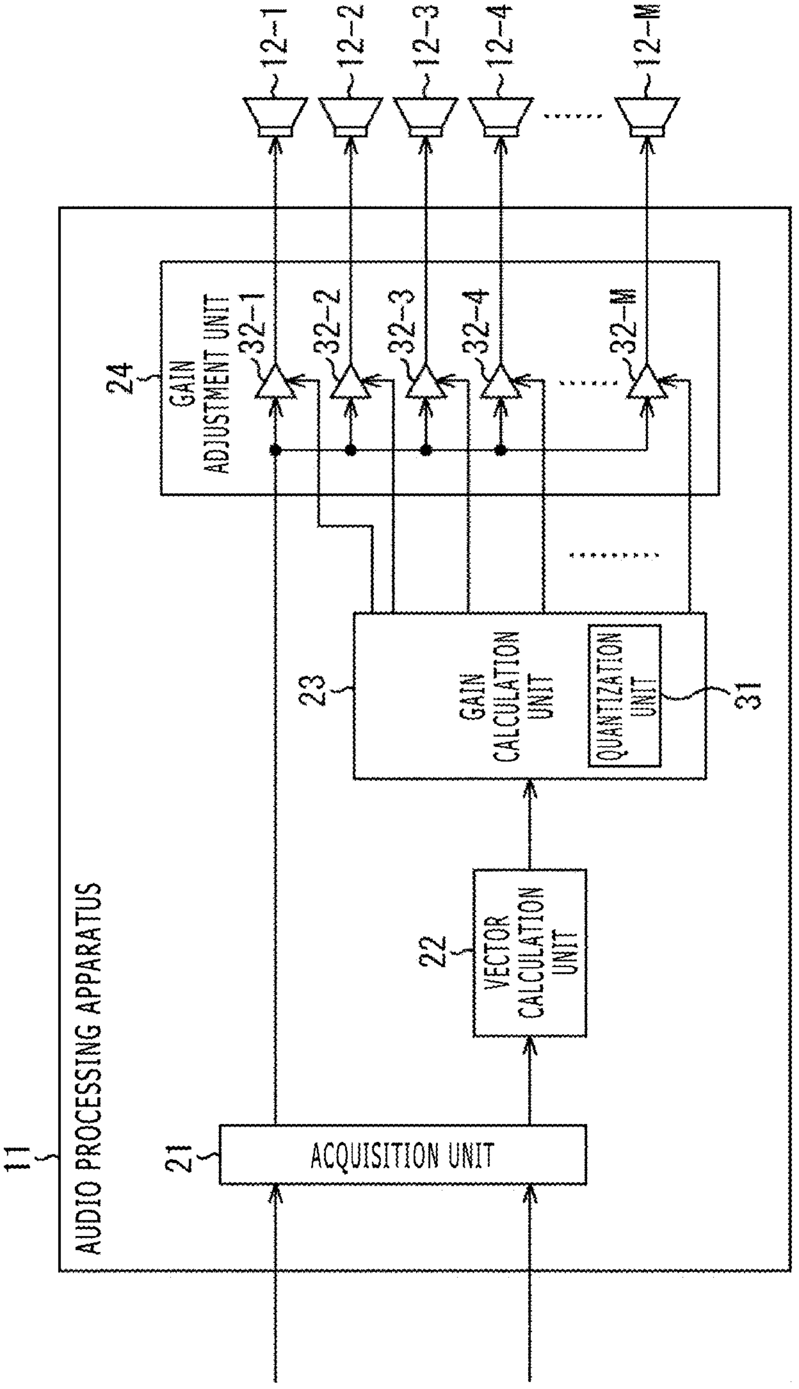
FIG. 6 is a view depicting an example of a configuration of an audio processing apparatus.

FIG. 6 is a view depicting an example of a configuration of an audio processing apparatus to which the present technology is applied.

To an audio processing apparatus 11 depicted in FIG. 6, speakers 12-1 to 12-M individually corresponding to M channels are connected. The audio processing apparatus 11 generates audio signals of different channels on the basis of an audio signal and metadata of an object supplied from the outside and supplies the audio signals to the speakers 12-1 to 12-M such that sound is reproduced by the speakers 12-1 to 12-M.

It is to be noted that, in the following description, where there is no necessity to particularly distinguish the speakers 12-1 to 12-M from each other, each of them is referred to merely as speaker 12. Each of the speakers 12 is a sound outputting unit that outputs sound on the basis of an audio signal supplied thereto.

The speakers 12 are disposed so as to surround a user who enjoys a content or the like. For example, the speakers 12 are disposed on a unit spherical plane described hereinabove.

The audio processing apparatus 11 includes an acquisition unit 21, a vector calculation unit 22, a gain calculation unit 23 and a gain adjustment unit 24.

The acquisition unit 21 acquires audio signals of objects from the outside and metadata for each frame of the audio signals of each object. For example, the audio data and the metadata are obtained by decoding encoded audio data and encoded metadata included in a bit stream outputted from an encoding apparatus by a decoding apparatus.

The acquisition unit 21 supplies the acquired audio signals to the gain adjustment unit 24 and supplies the acquired metadata to the vector calculation unit 22. Here, the metadata includes, for example, position information indicative of the position of the objects, importance information indicative of an importance degree of each object, spread indicative of a spatial extent of the sound image of the object and so forth as occasion demands.

The vector calculation unit 22 calculates spread vectors on the basis of the metadata supplied thereto from the acquisition unit 21 and supplies the spread vectors to the gain calculation unit 23. Further, as occasion demands, the vector calculation unit 22 supplies the position p of each object indicated by the position information included in the metadata, namely, also a vector p indicative of the position p, to the gain calculation unit 23.

The gain calculation unit 23 calculates a VBAP gain of a speaker 12 corresponding to each channel by the VBAP on the basis of the spread vectors and the vector p supplied from the vector calculation unit 22 and supplies the VBAP gains to the gain adjustment unit 24. Further, the gain calculation unit 23 includes a quantization unit 31 for quantizing the VBAP gain for each speaker.

The gain adjustment unit 24 performs, on the basis of each VBAP gain supplied from the gain calculation unit 23, gain adjustment for an audio signal of an object supplied from the acquisition unit 21 and supplies the audio signals of the M channels obtained as a result of the gain adjustment to the speakers 12.

The gain adjustment unit 24 includes amplification units 32-1 to 32-M. The amplification units 32-1 to 32-M multiply an audio signal supplied from the acquisition unit 21 by VBAP gains supplied from the gain calculation unit 23 and supply audio signals obtained by the multiplication to the speakers 12-1 to 12-M so as to reproduce sound.

It is to be noted that, in the following description, where there is no necessity to particularly distinguish the amplification units 32-1 to 32-M from each other, each of them is referred to also merely as amplification unit 32.

<Description of Reproduction Process>

Now, operation of the audio processing apparatus 11 depicted in FIG. 6 is described.

If an audio signal and metadata of an object are supplied from the outside, then the audio processing apparatus 11 performs a reproduction process to reproduce sound of the object.

In the following, the reproduction process by the audio processing apparatus 11 is described with reference to a flow chart of FIG. 7. It is to be noted that this reproduction process is performed for each frame of the audio signal.

At step S11, the acquisition unit 21 acquires an audio signal and metadata for one frame of an object from the outside and supplies the audio signal to the amplification unit 32 while it supplies the metadata to the vector calculation unit 22.

At step S12, the vector calculation unit 22 performs a spread vector calculation process on the basis of the metadata supplied from the acquisition unit 21 and supplies spread vectors obtained as a result of the spread vector calculation process to the gain calculation unit 23. Further, as occasion demands, the vector calculation unit 22 supplies also the vector p to the gain calculation unit 23.

It is to be noted that, although details of the spread vector calculation process are hereinafter described, in the spread vector calculation process, spread vectors are calculated by the spread three-dimensional vector method, the spread center vector method, the spread end vector method, the spread radiation vector method or the arbitrary spread vector method.

At step S13, the gain calculation unit 23 calculates the VBAP gains for the individual speakers 12 on the basis of location information indicative of the locations of the speakers 12 retained in advance and the spread vectors and the vector p supplied from the vector calculation unit 22.

In particular, in regard to each of the spread vectors and vectors p, a VBAP gain for each speaker 12 is calculated. Consequently, for each of the spread vectors and vectors p, a VBAP gain for one or more speakers 12 positioned in the proximity of the position of the object, namely, positioned in the proximity of the position indicated by the vector is obtained. It is to be noted that, although the VBAP gain for the spread vector is calculated without fail, if a vector p is not supplied from the vector calculation unit 22 to the gain calculation unit 23 by the process at step S12, then the VBAP gain for the vector p is not calculated.

At step S14, the gain calculation unit 23 adds the VBAP gains calculated in regard to each vector to calculate a VBAP gain addition value for each speaker 12. In particular, an addition value (sum total) of the VBAP gains of the vectors calculated for the same speaker 12 is calculated as the VBAP gain addition value.

At step S15, the quantization unit 31 decides whether or not binarization of the VBAP gain addition value is to be performed.

Whether or not binarization is to be performed may be decided, for example, on the basis of the index value index described hereinabove or may be decided on the basis of the importance degree of the object indicated by the importance information as the metadata.

If the decision is performed on the basis of the index value index, then, for example, the index value index read out from a bit stream may be supplied to the gain calculation unit 23. Alternatively, if the decision is performed on the basis of the importance information, then the importance information may be supplied from the vector calculation unit 22 to the gain calculation unit 23.

If it is decided at step S15 that binarization is to be performed, then at step S16, the quantization unit 31 binarizes the addition value of the VBAP gains determined for each speaker 12, namely, the VBAP gain addition value. Thereafter, the processing advances to step S17.

In contrast, if it is decided at step S15 that binarization is not to be performed, then the process at step S16 is skipped and the processing advances to step S17.

At step S17, the gain calculation unit 23 normalizes the VBAP gain for each speaker 12 such that the square sum of the VBAP gains of all speakers 12 may become 1.

In particular, normalization of the addition value of the VBAP gains determined for each speaker 12 is performed such that the square sum of all addition values may become 1.

The gain calculation unit 23 supplies the VBAP gains for the speakers 12 obtained by the normalization to the amplification units 32 corresponding to the individual speakers 12.

At step S18, the amplification unit 32 multiplies the audio signal supplied from the acquisition unit 21 by the VBAP gains supplied from the gain calculation unit 23 and supplies resulting values to the speaker 12.

Then at step S19, the amplification unit 32 causes the speakers 12 to reproduce sound on the basis of the audio signals supplied thereto, thereby ending the reproduction process. Consequently, a sound image of the object is localized in a desired partial space in the reproduction space.

In such a manner as described above, the audio processing apparatus 11 calculates spread vectors on the basis of metadata, calculates a VBAP gain for each vector for each speaker 12 and determines and normalizes an addition value of the VBAP gains for each speaker 12. By calculating VBAP gains in regard to the spread vectors in this manner, a spatial extent of a sound image of the object, especially, a shape of the object or a directionality of sound can be represented, and sound of higher quality can be obtained.

Besides, by binarizing the addition value of the VBAP gains as occasion demands, not only it is possible to reduce the processing amount upon rendering, but also it is possible to perform an appropriate process in response to the processing capacity (hardware scale) of the audio processing apparatus 11 to obtain sound of quality as high as possible.

<Description of Spread Vector Calculation Process>

Figure 7:
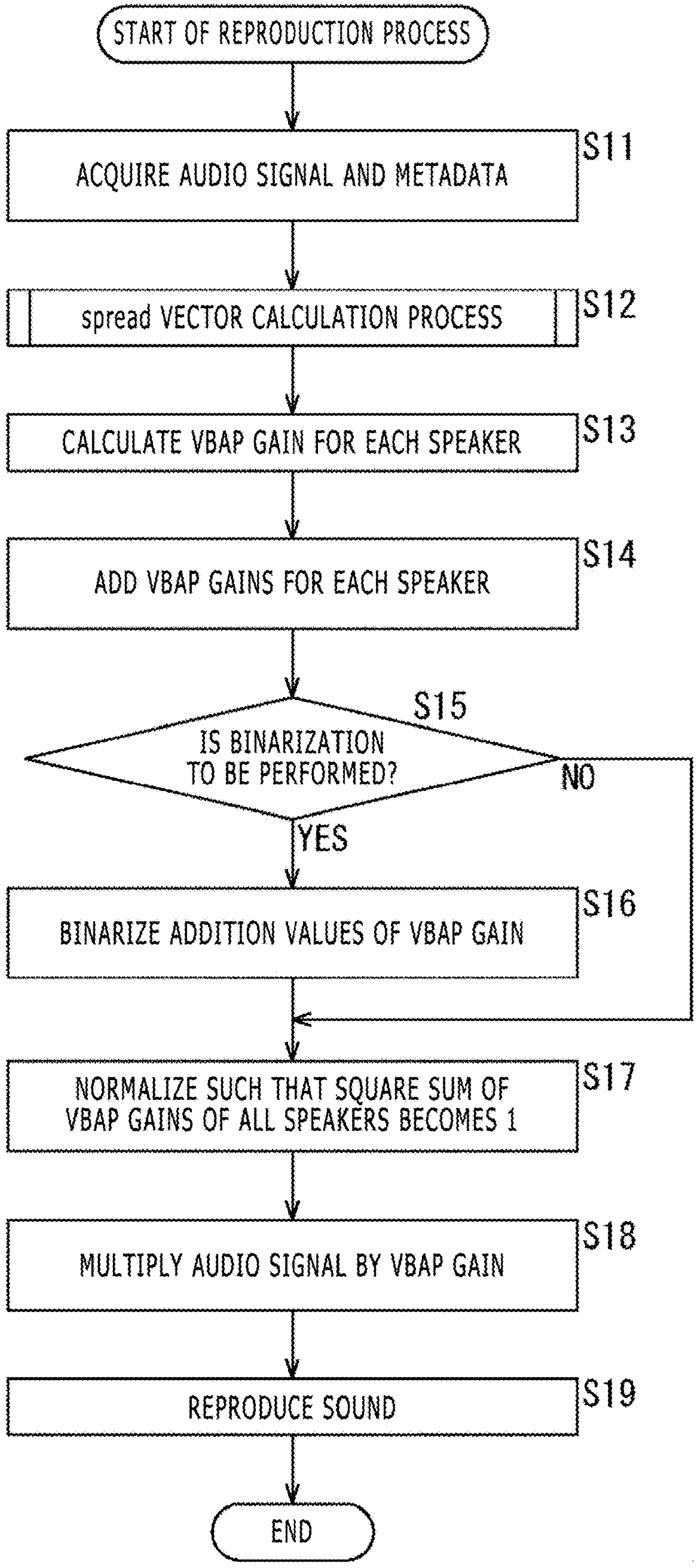
FIG. 7 is a flow chart illustrating a reproduction process.

Here, a spread vector calculation process corresponding to the process at step S12 of FIG. 7 is described with reference to a flow chart of FIG. 8.

At step S41, the vector calculation unit 22 decides whether or not a spread vector is to be calculated on the basis of a spread three-dimensional vector.

For example, which method is used to calculate a spread vector may be decided on the basis of the index value index similarly as in the case at step S15 of FIG. 7 or may be decided on the basis of the importance degree of the object indicated by the importance information.

If it is decided at step S41 that a spread vector is to be calculated on the basis of a spread three-dimensional vector, namely, if it is decided that a spread vector is to be calculated by the spread three-dimensional method, then the processing advances to step S42.

At step S42, the vector calculation unit 22 performs a spread vector calculation process based on a spread three-dimensional vector and supplies resulting vectors to the gain calculation unit 23. It is to be noted that details of the spread vector calculation process based on spread three-dimensional vectors are hereinafter described.

After spread vectors are calculated, the spread vector calculation process is ended, and thereafter, the processing advances to step S13 of FIG. 7.

On the other hand, if it is decided at step S41 that a spread vector is not to be calculated on the basis of a spread three-dimensional vector, then the processing advances to step S43.

At step S43, the vector calculation unit 22 decides whether or not a spread vector is to be calculated on the basis of a spread center vector.

If it is decided at step S43 that a spread vector is to be calculated on the basis of a spread center vector, namely, if it is decided that a spread vector is to be calculated by the spread center vector method, then the processing advances to step S44.

At step S44, the vector calculation unit 22 performs a spread vector calculation process on the basis of a spread center vector and supplies resulting vectors to the gain calculation unit 23. It is to be noted that details of the spread vector calculation process based on the spread center vector are hereinafter described.

After the spread vectors are calculated, the spread vector calculation process is ended, and thereafter, the processing advances to step S13 of FIG. 7.

On the other hand, if it is decided at step S43 that a spread vector is not to be calculated on the basis of a spread center vector, then the processing advances to step S45.

At step S45, the vector calculation unit 22 decides whether or not a spread vector is to be calculated on the basis of a spread end vector.

If it is decided at step S45 that a spread vector is to be calculated on the basis of a spread end vector, namely, if it is decided that a spread vector is to be calculated by the spread end vector method, then the processing advances to step S46.

At step S46, the vector calculation unit 22 performs a spread vector calculation process based on a spread end vector and supplies resulting vectors to the gain calculation unit 23. It is to be noted that details of the spread vector calculation process based on the spread end vector are hereinafter described.

After spread vectors are calculated, the spread vector calculation process is ended, and thereafter, the processing advances to step S13 of FIG. 7.

Further, if it is decided at step S45 that a spread vector is not to be calculated on the basis of the spread end vector, then the processing advances to step S47.

At step S47, the vector calculation unit 22 decides whether or not a spread vector is to be calculated on the basis of a spread radiation vector.

If it is decided at step S47 that a spread vector is to be calculated on the basis of a spread radiation vector, namely, if it is decided that a spread vector is to be calculated by the spread radiation vector method, then the processing advances to step S48.

At step S48, the vector calculation unit 22 performs a spread vector calculation process based on a spread radiation vector and supplies resulting vectors to the gain calculation unit 23. It is to be noted that details of the spread vector calculation process based on a spread radiation vector are hereinafter described.

After spread vectors are calculated, the spread vector calculation process is ended, and thereafter, the processing advances to step S13 of FIG. 7.

On the other hand, if it is decided at step S47 that a spread vector is not to be calculated on the basis of a spread radiation vector, namely, if it is decided that a spread vector is to be calculated by the spread radiation vector method, then the processing advances to step S49.

At step S49, the vector calculation unit 22 performs a spread vector calculation process based on the spread vector position information and supplies a resulting vector to the gain calculation unit 23. It is to be noted that details of the spread vector calculation process based on the spread vector position information are hereinafter described.

After spread vectors are calculated, the spread vector calculation process is ended, and thereafter, the processing advances to step S13 of FIG. 7.

The audio processing apparatus 11 calculates spread vectors by an appropriate one of the plurality of methods in this manner. By calculating spread vectors by an appropriate method in this manner, sound of the highest quality within the range of a permissible processing amount can be obtained in response to a hardware scale of a renderer and so forth.

<Explanation of Spread Vector Calculation Process Based on Spread Three-Dimensional Vector>

Figure 8:
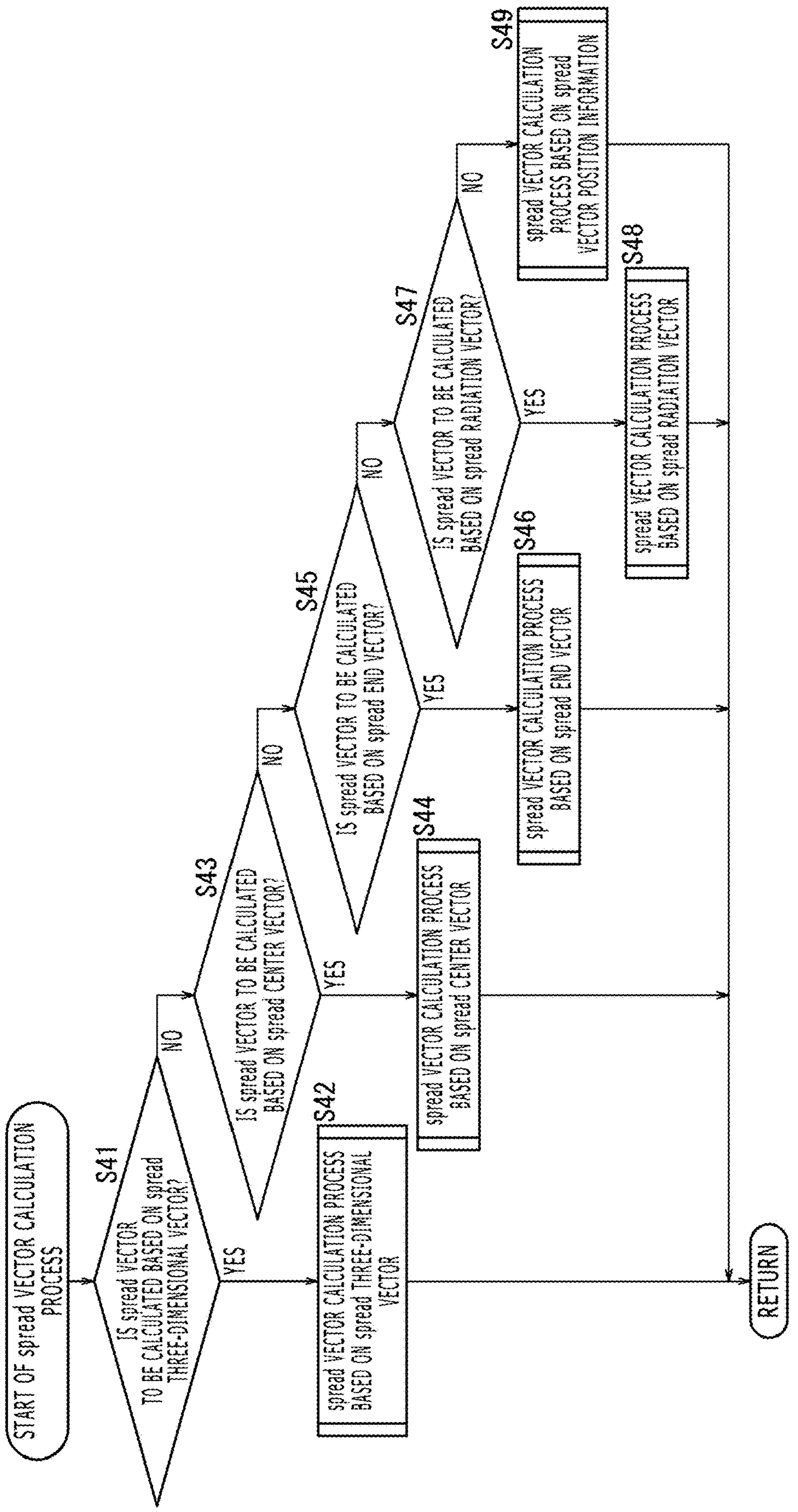
FIG. 8 is a flow chart illustrating a spread vector calculation process.

Now, details of the process corresponding to the processes at steps S42, S44, S46, S48 and S49 described hereinabove with reference to FIG. 8 are described.

First, a spread vector calculation process based on a spread three-dimensional vector corresponding to step S42 of FIG. 8 is described with reference to a flow chart of FIG. 9.

At step S81, the vector calculation unit 22 determines a position indicated by position information included in metadata supplied from the acquisition unit 21 as object position p. In other words, a vector indicative of the position p is the vector p.

At step S82, the vector calculation unit 22 calculates a spread on the basis of a spread three-dimensional vector included in the metadata supplied from the acquisition unit 21. In particular, the vector calculation unit 22 calculates the expression (1) given hereinabove to calculate a spread.

At step S83, the vector calculation unit 22 calculates spread vectors p0 to p18 on the basis of the vector p and the spread.

Here, the vector p is determined as vector p0 indicative of the center position pO, and the vector p is determined as it is as spread vector p0. Further, as spread vectors p1 to p18, vectors are calculated so as to be symmetrical in the upward and downward direction and the leftward and rightward direction within a region centered at the center position pO and defined by an angle indicated by the spread on the unit spherical plane similarly as in the case of the MPEG-H 3D Audio standard.

At step S84, the vector calculation unit 22 decides on the basis of the spread three-dimensional vector whether or not s3_azimuth≥s3_elevation is satisfied, namely, whether or not s3_azimuth is greater than s3_elevation.

If it is decided at step S84 that s3_azimuth≥s3_elevation is satisfied, then at step S85, the vector calculation unit 22 changes elevation of the spread vectors p1 to p18. In particular, the vector calculation unit 22 performs calculation of the expression (2) described hereinabove to correct elevation of the spread vectors to obtain final spread vectors.

After the final spread vectors are obtained, the vector calculation unit 22 supplies the spread vectors p0 to p18 to the gain calculation unit 23, thereby ending the spread vector calculation process based on the spread three-dimensional vector. Since the process at step S42 of FIG. 8 ends therewith, the processing thereafter advances to step S13 of FIG. 7.

On the other hand, if it is decided at step S84 that s3_azimuth≥s3_elevation is not satisfied, then at step S86, the vector calculation unit 22 changes azimuth of the spread vectors p1 to p18. In particular, the vector calculation unit 22 performs calculation of the expression (3) given hereinabove to correct azimuths of the spread vectors thereby to obtain final spread vectors.

After the final spread vectors are obtained, the vector calculation unit 22 supplies the spread vectors p0 to p18 to the gain calculation unit 23, thereby ending the spread vector calculation process based on the spread three-dimensional vector. Consequently, since the process at step S42 of FIG. 8 ends, the processing thereafter advances to step S13 of FIG. 7.

The audio processing apparatus 11 calculates each spread vector by the spread three-dimensional vector method in such a manner as described above. Consequently, it becomes possible to represent the shape of the object and the directionality of sound of the object and obtain sound of higher quality.

<Explanation of Spread Vector Calculation Process Based on Spread Center Vector>

Figure 10:
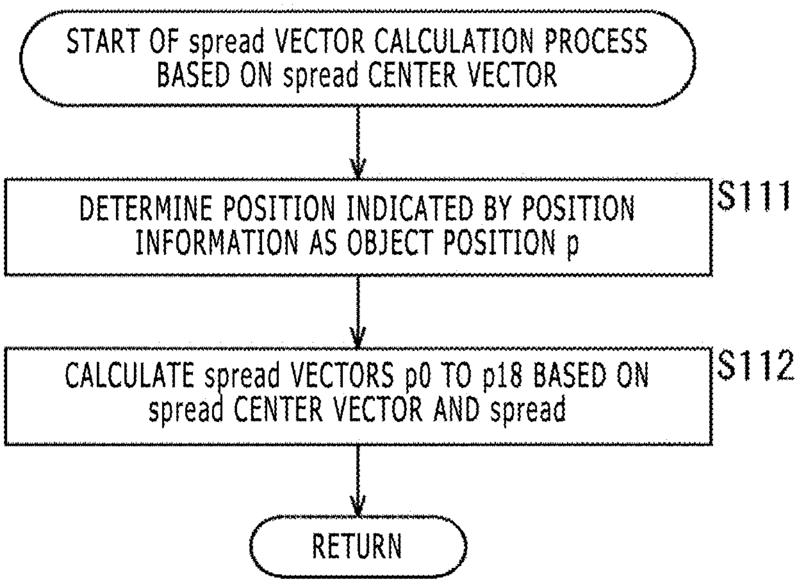
FIG. 10 is a flow chart illustrating the spread vector calculation process based on a spread center vector.

Now, a spread vector calculation process based on a spread center vector corresponding to step S44 of FIG. 8 is described with reference to a flow chart of FIG. 10.

Figure 9:
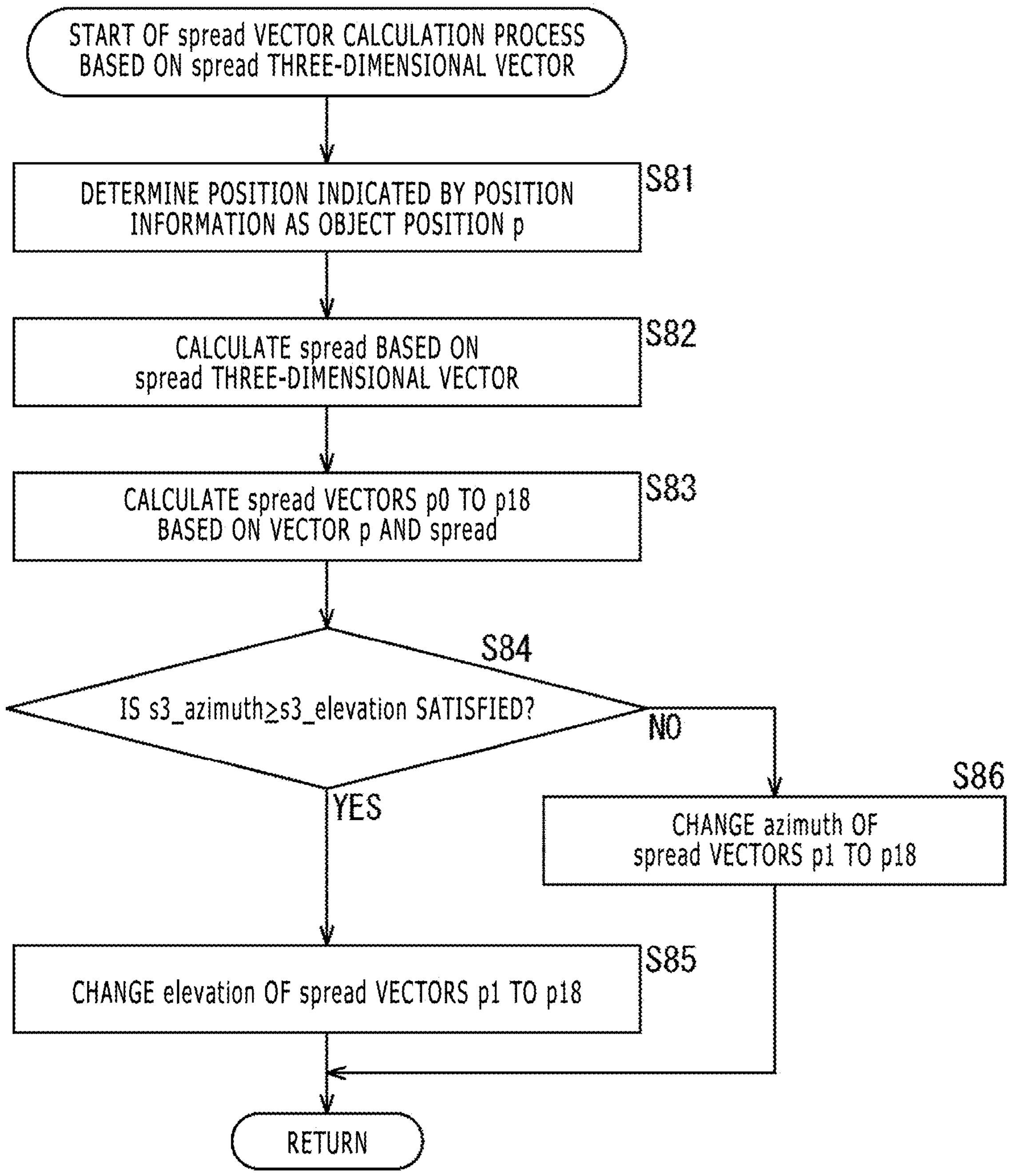
FIG. 9 is a flow chart illustrating the spread vector calculation process based on a spread three-dimensional vector.

It is to be noted that a process at step S111 is similar to the process at step S81 of FIG. 9, and therefore, description of it is omitted.

At step S112, the vector calculation unit 22 calculates spread vectors p0 to p18 on the basis a spread center vector and a spread included in metadata supplied from the acquisition unit 21.

In particular, the vector calculation unit 22 sets the position indicated by the spread center vector as center position pO and sets the vector indicative of the center position pO as spread vector p0. Further, the vector calculation unit 22 determines spread vectors p1 to p18 such that they are positioned symmetrical in the upward and downward direction and the leftward and rightward direction within a region centered at the center position pO and defined by an angle indicated by the spread on the unit spherical plane. The spread vectors p1 to p18 are determined basically similarly as in the case of the MPEG-H 3D Audio standard.

The vector calculation unit 22 supplies the vector p and the spread vectors p0 to p18 obtained by the processes described above to the gain calculation unit 23, thereby ending the spread vector calculation process based on the spread center vector. Consequently, the process at step S44 of FIG. 8 ends, and thereafter, the processing advances to step S13 of FIG. 7.

The audio processing apparatus 11 calculates a vector p and spread vectors by the spread center vector method in such a manner as described above. Consequently, it becomes possible to represent the shape of an object and the directionality of sound of the object and obtain sound of higher quality.

It is to be noted that, in the spread vector calculation process based on a spread center vector, the spread vector p0 may not be supplied to the gain calculation unit 23. In other words, the VBAP gain may not be calculated in regard to the spread vector p0.

<Explanation of Spread Vector Calculation Process Based on Spread End Vector>

Figure 11:
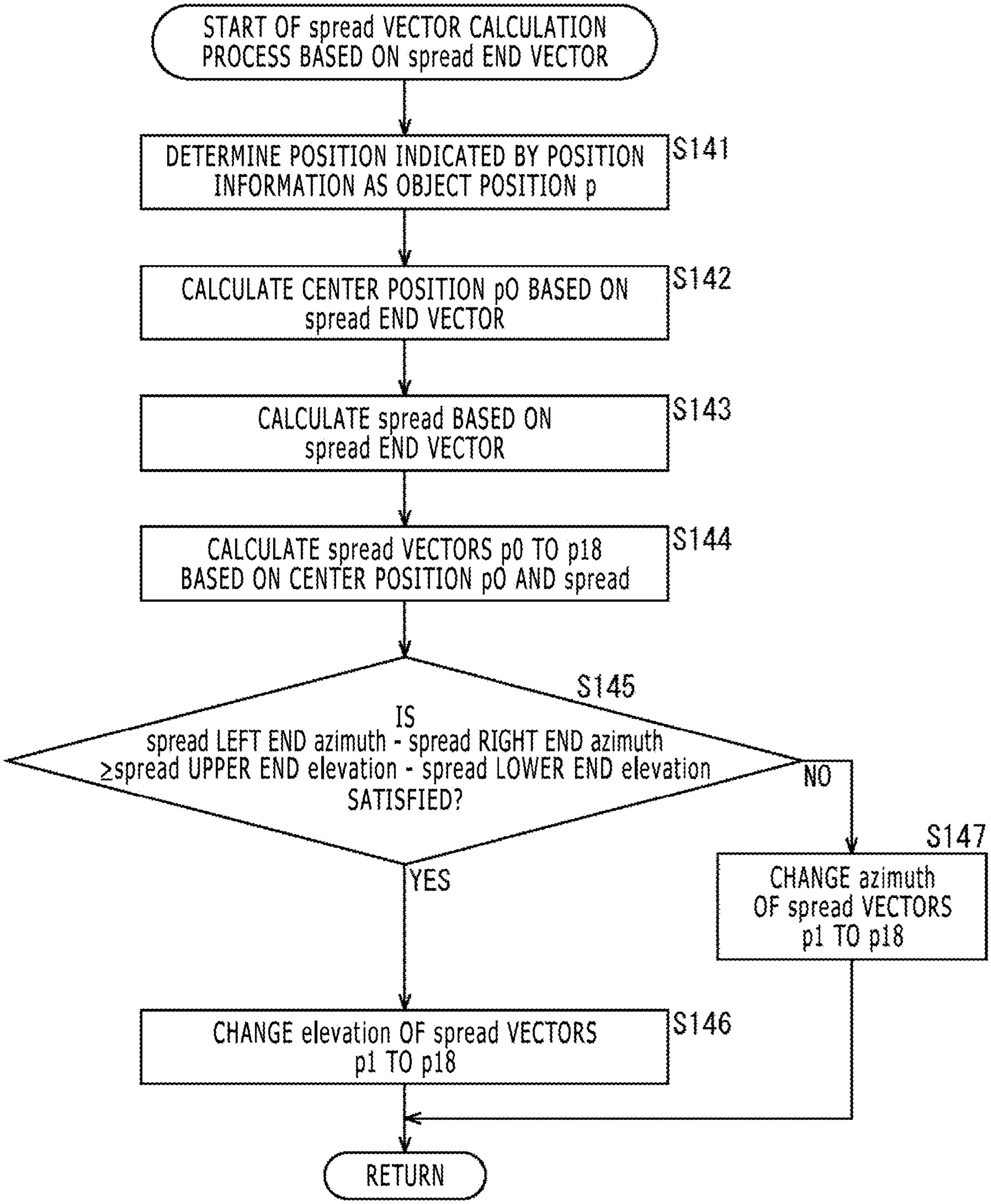
FIG. 11 is a flow chart illustrating the spread vector calculation process based on a spread end vector.

Further, a spread vector calculation process based on a spread end vector corresponding to step S46 of FIG. 8 is described with reference to a flow chart of FIG. 11.

It is to be noted that a process at step S141 is similar to the process at step S81 of FIG. 9, and therefore, description of it is omitted.

At step S142, the vector calculation unit 22 calculates the center position pO, namely, the vector pO, on the basis of a spread end vector included in metadata supplied from the acquisition unit 21. In particular, the vector calculation unit 22 calculates the expression (4) given hereinabove to calculate the center position pO.

At step S143, the vector calculation unit 22 calculates a spread on the basis of the spread end vector. In particular, the vector calculation unit 22 calculates the expression (5) given hereinabove to calculate a spread.

At step S144, the vector calculation unit 22 calculates spread vectors p0 to p18 on the basis of the center position pO and the spread.

Here, the vector pO indicative of the center position pO is set as it is as spread vector p0. Further, the spread vectors p1 to p18 are calculated such that they are positioned symmetrical in the upward and downward direction and the leftward and rightward direction within a region centered at the center position pO and defined by an angle indicated by the spread on the unit spherical plane similarly as in the case of the MPEG-H 3D Audio standard.

At step S145, the vector calculation unit 22 decides whether or not (spread left end azimuth−spread right end azimuth)≥(spread upper end elevation−spread lower end elevation) is satisfied, namely, whether or not the (spread left end azimuth−spread right end azimuth) is greater than the (spread upper end elevation−spread lower end elevation).

If it is decided at step S145 that (spread left end azimuth−spread right end azimuth)≥(spread upper end elevation−spread lower end elevation) is satisfied, then at step S146, the vector calculation unit 22 changes elevation of the spread vectors p1 to p18. In particular, the vector calculation unit 22 performs calculation of the expression (6) given hereinabove to correct elevations of the spread vectors to obtain final spread vectors.

After the final spread vectors are obtained, the vector calculation unit 22 supplies the spread vectors p0 to p18 and the vector p to the gain calculation unit 23, thereby ending the spread vector calculation process based on the spread end vector. Consequently, the process at step S46 of FIG. 8 ends, and thereafter, the processing advances to step S13 of FIG. 7.

On the other hand, if it is decided at step S145 that (spread left end azimuth−spread right end azimuth)≥(spread upper end elevation−spread lower end elevation) is not satisfied, then the vector calculation unit 22 changes azimuth of the spread vectors p1 to p18 at step S147. In particular, the vector calculation unit 22 performs calculation of the expression (7) given hereinabove to correct azimuth of the spread vectors to obtain final spread vectors.

After the final spread vectors are obtained, the vector calculation unit 22 supplies the spread vectors p0 to p18 and the vector p to the gain calculation unit 23, thereby to end the spread vector calculation process based on the spread end vector. Consequently, the process at step S46 of FIG. 8 ends, and thereafter, the processing advances to step S13 of FIG. 7.

As described above, the audio processing apparatus 11 calculates spread vectors by the spread end vector method. Consequently, it becomes possible to represent a shape of an object and a directionality of sound of the object and obtain sound of higher quality.

It is to be noted that, in the spread vector calculation process based on a spread end vector, the spread vector p0 may not be supplied to the gain calculation unit 23. In other words, the VBAP gain may not be calculated in regard to the spread vector p0.

<Explanation of Spread Vector Calculation Process Based on Spread Radiation Vector>

Figure 12:
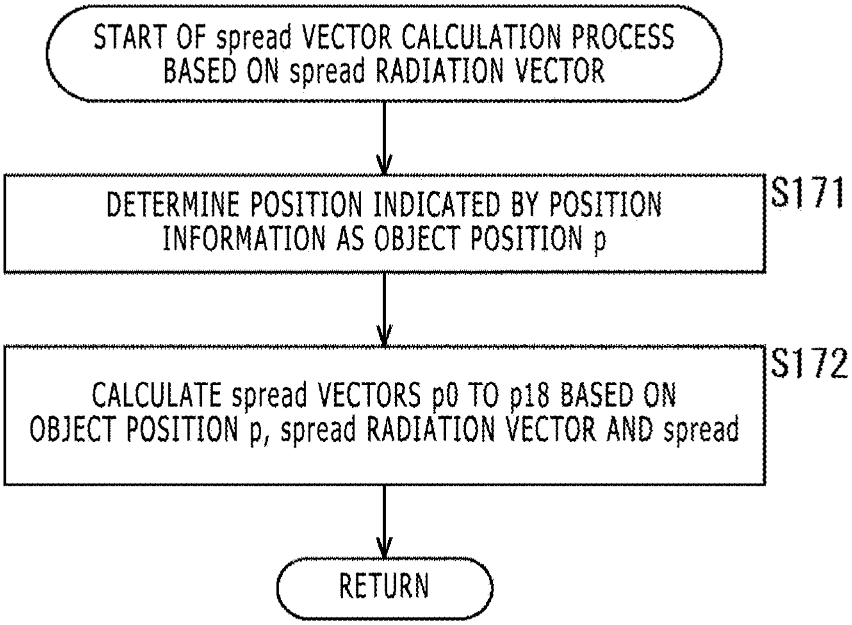
FIG. 12 is a flow chart illustrating the spread vector calculation process based on a spread radiation vector.

Now, a spread vector calculation process based on a spread radiation vector corresponding to step S48 of FIG. 8 is described with reference to a flow chart of FIG. 12.

It is to be noted that a process at step S171 is similar to the process at step S81 of FIG. 9 and, therefore, description of the process is omitted.

At step S172, the vector calculation unit 22 calculates spread vectors p0 to p18 on the basis of a spread radiation vector and a spread included in metadata supplied from the acquisition unit 21.

In particular, the vector calculation unit 22 sets a position indicated by a vector obtained by adding a vector p indicative of an object position p and the radiation vector as center position pO. The vector indicating this center portion pO is the vector pO, and the vector calculation unit 22 sets the vector pO as it is as spread vector p0.

Further, the vector calculation unit 22 determines spread vectors p1 to p18 such that they are positioned symmetrical in the upward and downward direction and the leftward and rightward direction within a region centered at the center position pO and defined by an angle indicated by the spread on the unit spherical plane. The spread vectors p1 to p18 are determined basically similarly as in the case of the MPEG-H 3D Audio standard.

The vector calculation unit 22 supplies the vector p and the spread vectors p0 to p18 obtained by the processes described above to the gain calculation unit 23, thereby ending the spread vector calculation process based on a spread radiation vector. Consequently, since the process at step S48 of FIG. 8 ends, the processing thereafter advances to step S13 of FIG. 7.

The audio processing apparatus 11 calculates the vector p and the spread vectors by the spread radiation vector method in such a manner as described above. Consequently, it becomes possible to represent a shape of an object and a directionality of sound of the object and obtain sound of higher quality.

It is to be noted that, in the spread vector calculation process based on a spread radiation vector, the spread vector p0 may not be supplied to the gain calculation unit 23. In other words, the VBAP gain may not be calculated in retard to the spread vector p0.

<Explanation of Spread Vector Calculation Process Based on Spread Vector Position Information>

Figure 13:
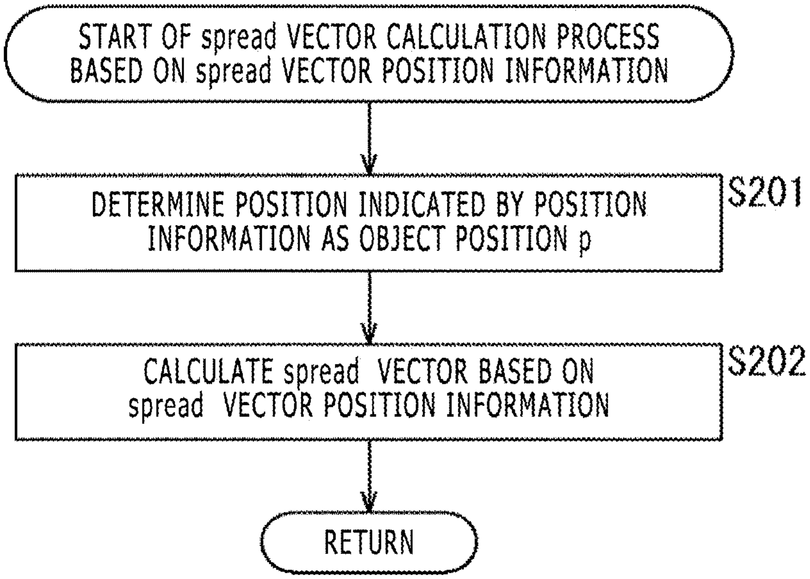
FIG. 13 is a flow chart illustrating the spread vector calculation process based on spread vector position information.

Now, a spread vector calculation process based on spread vector position information corresponding to step S49 of FIG. 8 is described with reference to a flow chart of FIG. 13.

It is to be noted that a process at step S201 is similar to the process at step S81 of FIG. 9, and therefore, description of it is omitted.

At step S202, the vector calculation unit 22 calculates spread vectors on the basis of spread vector number information and spread vector position information included in metadata supplied from the acquisition unit 21.

In particular, the vector calculation unit 22 calculates a vector that has a start point at the origin O and has an end point at a position indicated by the spread vector position information as spread vector. Here, the number of spread vectors equal to a number indicated by the spread vector number information is calculated.

The vector calculation unit 22 supplies the vector p and the spread vectors obtained by the processes described above to the gain calculation unit 23, thereby ending the spread vector calculation process based on spread vector position information. Consequently, since the process at step S49 of FIG. 8 ends, the processing thereafter advances to step S13 of FIG. 7.

The audio processing apparatus 11 calculates the vector p and the spread vectors by the arbitrary spread vector method in such a manner as described above. Consequently, it becomes possible to represent a shape of an object and a directionality of sound of the object and obtain sound of higher quality.

Second Embodiment

<Processing Amount Reduction of Rendering Process>

Incidentally, VBAP is known as a technology for controlling localization of a sound image using a plurality of speakers, namely, for performing a rendering process, as described above.

In the VBAP, by outputting sound from three speakers, a sound image can be localized at an arbitrary point on the inner side of a triangle configured from the three speakers. In the following, a triangle configured especially from such three speakers is called mesh.

Since the rendering process by the VBAP is performed for each object, in the case where the number of objects is great such as, for example, in a game, the processing amount of the rendering process is great. Therefore, a renderer of a small hardware scale may not be able to perform rendering for all objects, and as a result, sound only of a limited number of objects may be reproduced. This may damage the presence or the sound quality upon sound reproduction.

Therefore, the present technology makes it possible to reduce the processing amount of a rendering process while deterioration of the presence or the sound quality is suppressed.

In the following, such a technology as just described is described.

In an ordinary VBAP process, namely, in a rendering process, processing of the processes A1 to A3 described hereinabove is performed for each object to generate audio signals for the speakers.

Since the number of speakers for which a VBAP gain is substantially calculated is three and the VBAP gain for each speaker is calculated for each of samples that configure an audio signal, in the multiplication process in the process A3, multiplication is performed by the number of times equal to (sample number of audio signal×3).

In contrast, in the present technology, by performing an equal gain process for VBAP gains, namely, a quantization process of VBAP gains, and a mesh number switching process for changing the number of meshes to be used upon VBAP gain calculation in a suitable combination, the processing amount of the rendering process is reduced.

(Quantization Process)

First, a quantization process is described. Here, as examples of a quantization process, a binarization process and a ternarization process are described.

Where a binarization process is performed as the quantization process, after the process A1 is performed, a VBAP gain obtained for each speaker by the process A1 is binarized. In the binarization, for example, a VBAP gain for each speaker is represented by one of 0 and 1.

It is to be noted that the method for binarizing a VBAP gain may be any method such as rounding off, ceiling (round up), flooring (truncation) or a threshold value process.

After the VBAP gains are binarized in this manner, the process A2 and the process A3 are performed to generate audio signals for the speakers.

At this time, in the process A2, since normalization is performed on the basis of the binarized VBAP gains, the final VBAP gains for the speakers become one value other than 0 similarly as upon quantization of a spread vector described hereinabove. In other words, if the VBAP gains are binarized, then the values of the final VBAP gains of the speakers are either 0 or a predetermined value.

Accordingly, in the multiplication process in the process A3, multiplication may be performed by (sample number of audio signal ×1) times, and therefore the processing amount of the rendering process can be reduced significantly.

Similarly, after the process A1, the VBAP gains obtained for the speakers may be ternarized. In such a case as just described, the VBAP gain obtained for each speaker by the process A1 is ternarized into one of values of 0, 0.5 and 1. Then, the process A2 and the process A3 are thereafter performed to generate audio signals for the speakers.

Accordingly, since the multiplication time number in the multiplication process in the process A3 becomes (sample number of audio signal×2) in the maximum, the processing amount of the rendering process can be reduced significantly.

It is to be noted that, although description here is given taking a case in which a VBAP gain is binarized or ternarized as an example, a VBAP gain may be quantized into 4 or more values. Generalizing this, for example, a VBAP gain is quantized such that it has one of x gains equal to or greater than 2, or in other words, if a VBAP gain is quantized by a quantization number x, then the number of times of the multiplication process in the process A3 becomes (x−1) in the maximum.

The processing amount of the rendering process can be reduced by quantizing a VBAP gain in such a manner as described above. If the processing amount of the rendering process decreases in this manner, then even in the case where the number of objects is great, it becomes possible to perform rendering for all objects, and therefore, deterioration of the presence or the sound quality upon sound reproduction can be suppressed to a low level. In other words, the processing amount of the rendering process can be reduced while deterioration of the presence or the sound quality is suppressed.

(Mesh Number Switching Process)

Now, a mesh number switching process is described.

In the VBAP, as descried hereinabove, for example, with reference to FIG. 1, a vector p indicative of the position p of a sound image of an object of a processing target is represented by a linear sum of vectors $I_1$ to $I_3$ directed in the directions of the three speakers SP1 to SP3, and coefficients $g_1$ to $g_3$ by which the vectors are multiplied are VBAP gains for the speakers. In the example of FIG. 1, a triangular region TR11 surrounded by the speakers SP1 to SP3 forms one mesh.

Upon calculation of a VBAP gain, the three coefficients $g_1$ to $g_3$ are determined by calculation from an inverse matrix $L_{123}^{-1}$ of a mesh of a triangular shape and the position p of the sound image of the object particularly by the following expression (8):

[Expression 8]

$$[g_1 g_2 g_3] = pL_{123}^{-1} = [p_1 p_2 p_3]\begin{bmatrix} I_{11} & I_{12} & I_{13} \\ I_{21} & I_{22} & I_{23} \\ I_{31} & I_{32} & I_{33} \end{bmatrix}^{-1} \quad (8)$$

It is to be noted that p1, p2 and p3 in the expression (8) indicate an x coordinate, a y coordinate and a z coordinate on a Cartesian coordinate system indicative of the position of the sound image of the object, namely, on the three-dimensional coordinate system depicted in FIG. 2.

Further, $I_{11}$, $I_{12}$ and $I_{13}$ are values of an x component, a y component and a z component in the case where the vector $I_1$ directed to the first speaker SP1 configuring the mesh is decomposed into components on the x axis, y axis and z axis, and correspond to an x coordinate, a y coordinate and a z coordinate of the first speaker SP1, respectively.

Similarly, $I_{21}$, $I_{22}$ and $I_{23}$ are values of an x component, a y component and a z component in the case where the vector $I_2$ directed to the second speaker SP2 configuring the mesh is decomposed into components on the x axis, y axis and z axis, respectively. Further, $I_{31}$, $I_{32}$ and $I_{33}$ are values of an x component, a y component and a z component in the case where the vector $I_3$ directed to the third speaker SP3 configuring the mesh is decomposed into components on the x axis, y axis and z axis, respectively.

Furthermore, transformation from $p_1$, $p_2$ and $p_3$ of the three-dimensional coordinate system of the position p into coordinates θ, γ and r of the spherical coordinate system is defined, where r=1, as represented by the following expression (9). Here, θ, γ and r are a horizontal direction angle azimuth, a vertical direction angle elevation and a distance radius described hereinabove, respectively.

[Expression 9]

$$[p1p2p3]=[\cos(\theta)\times\cos(\gamma)\sin(\theta)\times\cos(\gamma)\sin(\gamma)] \quad (9)$$

As described hereinabove, in a space at the content reproduction side, namely, in a reproduction space, a plurality of speakers are disposed on a unit sphere, and one mesh is configured from three speakers from among the plurality of speakers. Further, the overall surface of the unit sphere is basically covered with a plurality of meshes without a gap left therebetween. Further, the meshes are determined such that they do not overlap with each other.

In the VBAP, if sound is outputted from two or three speakers that configure one mesh including a position p of an object from among speakers disposed on the surface of a unit sphere, then a sound image can be localized at the position p, and therefore, the VBAP gain of the speakers other than the speakers configuring the mesh is 0.

Accordingly, upon calculation of a VBAP gain, one mesh including the position p of the object may be specified to calculate a VBAP gain for the speakers that configure the mesh. For example, whether or not a predetermined mesh is a mesh including the position p can be decided from the calculated VBAP gains.

In particular, if the VBAP gains of three speakers calculated in regard to a mesh are all values equal to or higher than 0, then the mesh is a mesh including the position p of the object. On the contrary, if at least one of the VBAP gains for the three speakers has a negative value, then since the position p of the object is positioned outside the mesh configured from the speakers, the calculated VBAP gain is not a correct VBAP gain.

Therefore, upon calculation of a VBAP gain, the meshes are selected one by one as a mesh of a processing target, and calculation of the expression (8) given hereinabove is performed for the mesh of the processing target to calculate a VBAP gain for each speaker configuring the mesh.

Then, from a result of the calculation of the VBAP gains, whether or not the mesh of the processing target is a mesh including the position p of the object is decided, and if it is decided that the mesh of the processing target is a mesh that does not include the position p, then a next mesh is determined as a mesh of a new processing target and similar processes are performed for the mesh.

On the other hand, if it is decided that the mesh of the processing target is a mesh that includes the position p of the object, then the VBAP gains of the speakers configuring the mesh are determined as calculated VBAP gains while the VBAP gains of the other speakers are set to 0. Consequently, the VBAP gains for all speakers are obtained.

In this manner, in the rendering process, a process for calculating a VBAP gain and a process for specifying a mesh that includes the position p are performed simultaneously.

In particular, in order to obtain correct VBAP gains, a process of successively selecting a mesh of a processing target until all of VBAP gains for speakers configuring a mesh indicate values equal to or higher than 0 and calculating VBAP gains of the mesh is repeated.

Accordingly, in the rendering process, as the number of meshes on the surface of a unit sphere, the processing amount of processes required to specify a mesh including the position p, namely, to obtain a correct VBAP gain increases.

Therefore, in the present technology, not all of speakers in an actual reproduction environment are used to form (configure) meshes, but only some speakers from among all speakers are used to form meshes to reduce the total number of meshes and reduce the processing amount upon rendering processing. In particular, in the present technology, a mesh number switching process for changing the total number of meshes is performed.

Figure 14:
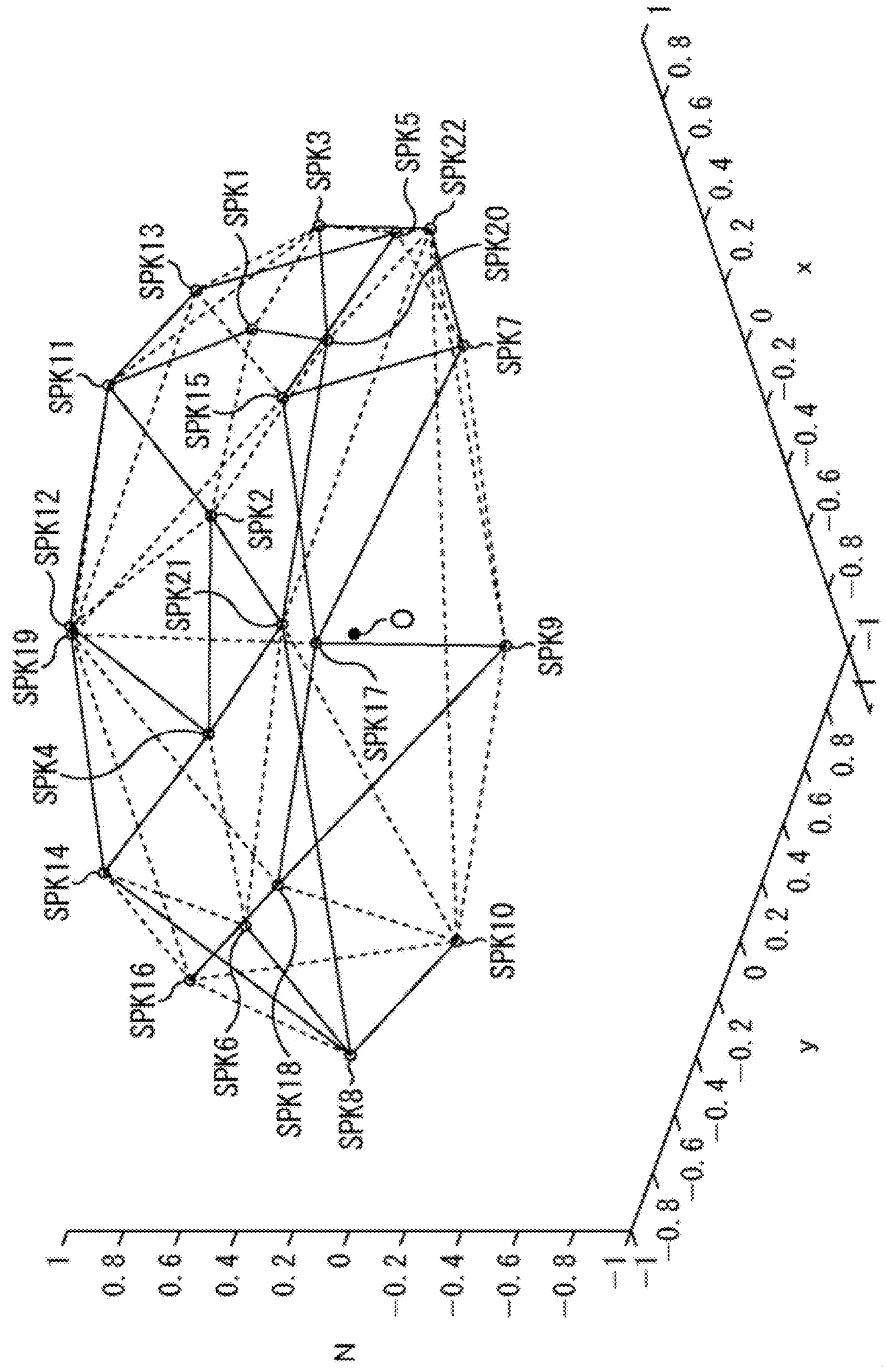
FIG. 14 is a view illustrating switching of the number of meshes.

In particular, for example, in a speaker system of 22 channels, totaling 22 speakers including speakers SPK1 to SPK22 are disposed as speakers of different channels on the surface of a unit sphere as depicted in FIG. 14. It is to be noted that, in FIG. 14, the origin O corresponds to the origin O depicted in FIG. 2.

Where the 22 speakers are disposed on the surface of the unit sphere in this manner, if meshes are formed such that they cover the unit sphere surface using all of the 22 speakers, then the total number of meshes on the unit sphere is 40.

Figure 15:
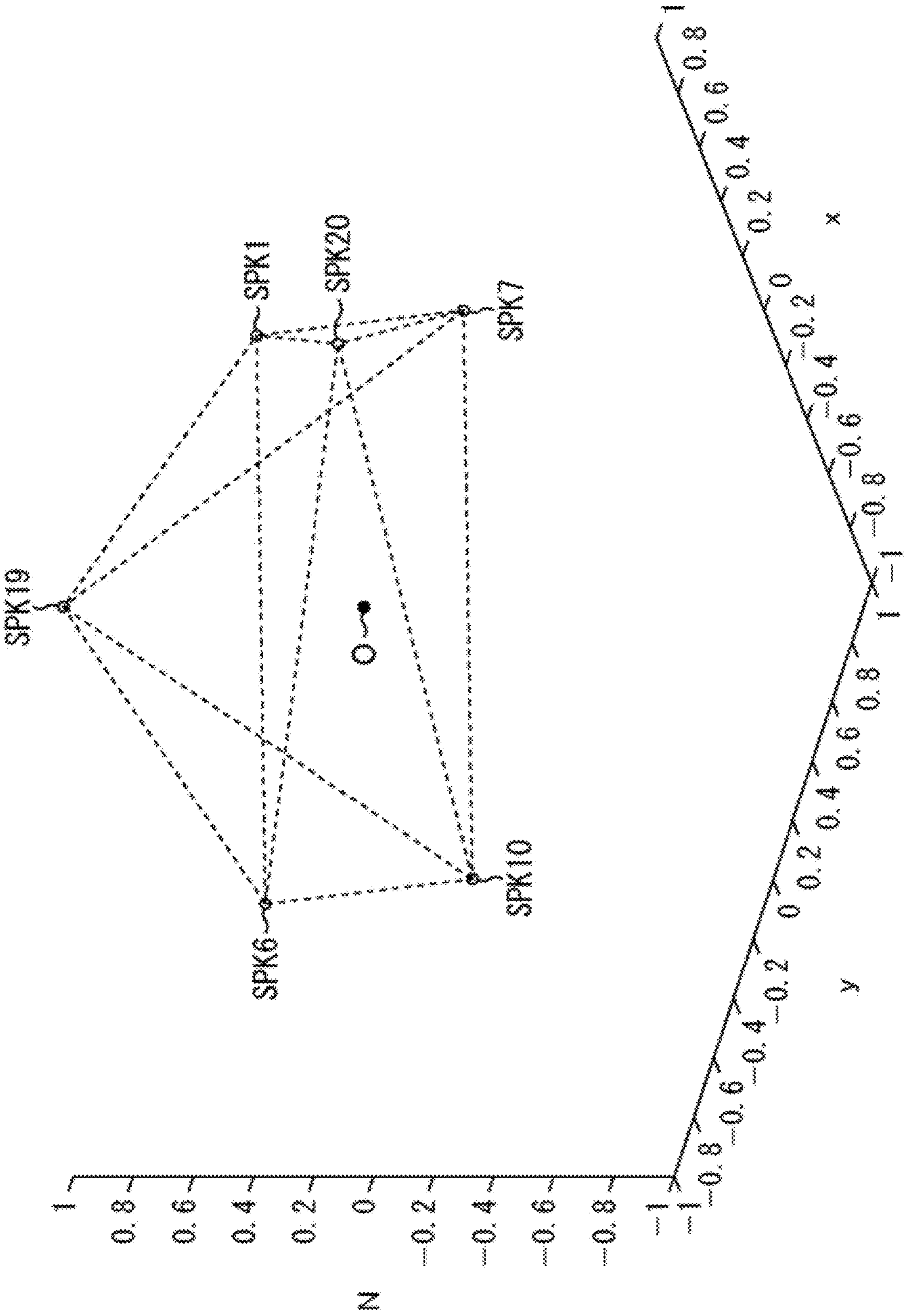
FIG. 15 is a view illustrating switching of the number of meshes.

In contrast, it is assumed that, for example, as depicted in FIG. 15, from among the totaling 22 speakers SPK1 to SPK22, only totaling six speakers of the speakers SPK1, SPK6, SPK7, SPK10, SPK19 and SPK20 are used to form meshes. It is to be noted that, in FIG. 15, portions corresponding to those in the case of FIG. 14 are denoted by like reference symbols and description of them is omitted suitably.

In the example of FIG. 15, since only the totaling six speakers from among the 22 speakers are used to form meshes, the total number of meshes on the unit sphere is eight, and the total number of meshes can be reduced significantly. As a result, in the example depicted in FIG. 15, in comparison with the case in which all of the 22 speakers are used to form meshes as depicted in FIG. 14, the processing amount when VBAP gains are calculated can be reduced to 8/40 times, and the processing amount can be reduced significantly.

It is to be noted that, also in the present example, since the overall surface of the unit sphere is covered with eight meshes without a gap, it is possible to localize a sound image at an arbitrary position on the surface of the unit sphere. However, since the area of each mesh decreases as the total number of meshes provided on the unit sphere surface increases, it is possible to control localization of a sound image with a higher accuracy as the total number of meshes increases.

If the total number of meshes is changed by the mesh number switching process, then when speakers to be used to form the number of meshes after the change are selected, it is desirable to select speakers whose positions in the vertical direction (upward and downward direction) as viewed from the user who is at the origin O, namely, whose positions in the direction of the vertical direction angle elevation are different from each other. In other words, it is desirable to use three or more speakers including speakers positioned at different heights from each other to form the number of meshes after the change. This is because it is intended to suppress deterioration of the three-dimensional sense, namely, the presence, of sound.

Figure 16:
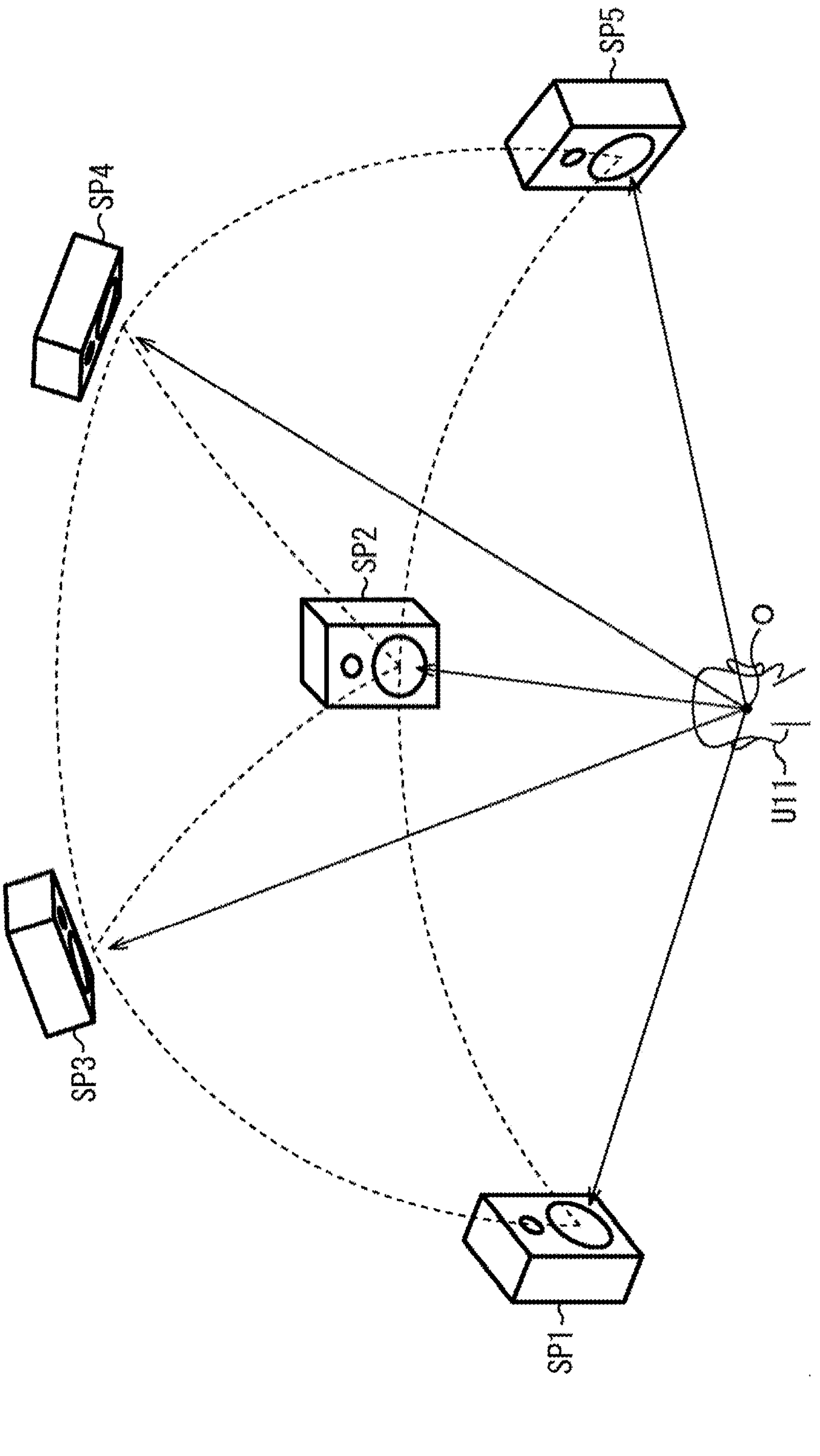
FIG. 16 is a view illustrating formation of a mesh.

For example, a case is considered in which some or all of five speakers including the speakers SP1 to SP5 disposed on a unit sphere surface are used to form meshes as depicted in FIG. 16. It is to be noted that, in FIG. 16, portions corresponding to those in the case of FIG. 3 are denoted by like reference symbols and description of them is omitted.

Where all of the five speakers SP1 to SP5 in the example depicted in FIG. 16 are used to form meshes with which a unit sphere surface are covered, the number of meshes is three. In particular, three regions including a region of a triangular shape surrounded by the speakers SP1 to SP3, another region of a triangular shape surrounded by the speakers SP2 to SP4 and a further region of a triangular shape surrounded by the speakers SP2, SP4 and SP5 form meshes.

In contrast, for example, if only the speakers SP1, SP2 and SP5 are used, then the mesh does not form a triangular shape but forms a two-dimensional arc. In this case, a sound image of an object can be localized only on the arc interconnecting the speakers SP1 and SP2 or on the arc interconnecting the speakers SP2 and SP5 of the unit sphere.

In this manner, if all speakers used to form meshes are speakers at the same height in the vertical direction, namely, speakers of the same layer, then since the heights of localization positions of all sound images of an object become a same height, the presence is deteriorated.

Accordingly, it is desirable to use three or more speakers including speakers whose positions in a vertical direction (the vertical direction) are different from each other to form one or a plurality of meshes such that deterioration of the presence can be suppressed.

In the example of FIG. 16, for example, if the speaker SP1 and the speakers SP3 to SP5 from among the speakers SP1 to SP5 are used, then two meshes can be formed such that they cover the overall unit sphere surface. In this example, the speakers SP1 and SP5 and the speakers SP3 and SP4 are positioned at heights different from each other.

In this case, for example, a region of a triangular shape surrounded by the speakers SP1, SP3 and SP5 and another region of a triangular shape surrounded by the speakers SP3 to SP5 are formed as meshes.

Further, in this example, also it is possible to form two regions including a region of a triangular shape surrounded by the speakers SP1, SP3 and SP4 and another region of a triangular shape surrounded by the speakers SP1, SP4 and SP5 as meshes.

In the two examples above, since a sound image can be localized at an arbitrary position on the unit sphere surface, deterioration of the presence can be suppressed. Further, in order to form meshes such that the overall unit sphere surface is covered with a plurality of meshes, it is desirable to use a so-called top speaker positioned just above the user without fail. For example, the top speaker is the speaker SPK19 depicted in FIG. 14.

By performing a mesh number switching process to change the total number of meshes in such a manner as described above, it is possible to reduce the processing amount of a rendering process and besides it is possible to suppress deterioration of the presence or the sound quality upon sound reproduction to a low level similarly as in the case of a quantization process. In other words, the processing amount of the rendering process can be reduced while deterioration of the presence or the sound quality is suppressed.

To select whether or not such a mesh number switching process is to be performed or to which number the total number of meshes is set in the mesh number switching process can be regarded as to select the total number of meshes to be used to calculate VBAP gains.

(Combination of Quantization Process and Mesh Number Switching Process)

In the foregoing description, as a technique for reducing the processing amount of a rendering process, a quantization process and a mesh number switching process are described.

At the renderer side that performs a rendering process, some of the processes described as a quantization process or a mesh number switching process may be used fixedly, or such processes may be switched or may be combined suitably.

For example, which processes are to be performed in combination may be determined on the basis of the total number of objects (hereinafter referred to as object number), importance information included in metadata of an object, a sound pressure of an audio signal of an object or the like. Further, it is possible to perform combination of processes, namely, switching of a process, for each object or for each frame of an audio signal.

For example, where switching of a process is performed in response to the object number, such a process as described below may be performed.

For example, where the object number is equal to or greater than 10, a binarization process for a VBAP gain is performed for all objects. In contrast, where the object number is smaller than 10, only the process A1 to the process A3 described hereinabove are performed as usual.

By performing processes as usual when the object number is small but performing a binarization process when the object number is great in this manner, rendering can be performed sufficiently even by a renderer of a small hardware scale, and sound of quality as high as possible can be obtained.

Further, when switching of a process is performed in response to the object number, a mesh number switching process may be performed in response to the object number to change the total number of meshes appropriately.

In this case, for example, it is possible to set the total number of meshes to 8 when the object number is equal to or greater than 10 but set the total number of meshes to 40 when the object number is smaller than 10. Further, the total number of meshes may be changed among multiple stages in response to the object number such that the total number of meshes decreases as the object number increases.

By changing the total number of meshes in response to the object number in this manner, it is possible to adjust the processing amount in response to the hardware scale of a renderer thereby to obtain sound of quality as high as possible.

Further, where switching of a process is performed on the basis of importance information included in metadata of an object, the following process can be performed.

For example, when the importance information of the object has the highest value indicative of the highest importance degree, only the processes A1 to A3 are performed as usual, but where the importance information of the object has a value other than the highest value, a binarization process for a VBAP gain is performed.

Further, for example, a mesh number switching process may be performed in response to the value of the importance information of the object to change the total number of messes appropriately. In this case, the total number of meshes may be increased as the importance degree of the object increases, and the total number of meshes can be changed among multiple stages.

In those examples, the process can be switched for each object on the basis of the importance information of each object. In the process described here, it is possible to increase the sound quality in regard to an object having a high importance degree but decrease the sound quality in regard to an object having a low importance degree thereby to reduce the processing amount. Accordingly, when sound of objects of various importance degrees are to be reproduced simultaneously, sound quality deterioration on the auditory sensation is suppressed most to reduce the processing amount, and it can be considered that this is a technique that is well-balanced between assurance of sound quality and processing amount reduction.

In this manner, when switching of a process is performed for each object on the basis of the importance information of an object, it is possible to increase the total number of objects as the importance degree of the object increases or to avoid performance of the quantization process when the importance degree of the object is high.

In addition, also with regard to an object having a low importance degree, namely, with regard to an object whose value of the importance information is lower than a predetermined value, the total number of meshes may be increased for an object positioned at a position near to an object that has a higher importance degree, namely, an object whose value of the importance information is equal to or higher than a predetermined value or the quantization process may not be performed.

In particular, in regard to an object whose importance information indicates the highest value, the total number of meshes is set to 40, but in regard to an object whose importance information does not indicate the highest value, the total number of meshes is decreased.

In this case, in regard to an object whose importance information is not the highest value, the total number of meshes may be increased as the distance between the object and an object whose importance information is the highest value decreases. Usually, since a user listens especially carefully to sound of an object of a high importance degree, if the sound quality of sound of a different object positioned near to the object is low, then the user will feel that the sound quality of the entire content is not good. Therefore, by determining the total number of meshes also in regard to an object that is positioned near to an object having a high importance degree such that sound quality as high as possible can be obtained, deterioration of sound quality on the auditory sensation can be suppressed.

Further, a process may be switched in response to a sound pressure of an audio signal of an object. Here, the sound pressure of an audio signal can be determined by calculating a square root of a mean squared value of sample values of samples in a frame of a rendering target of an audio signal. In particular, the sound pressure RMS can be determined by calculation of the following expression (10):

[Expression 10]

$$RMS = 20 \times \log_{10}\left(\sqrt{\frac{1}{N}\sum_{n=0}^{N-1}(Xn)^2}\right) \tag{10}$$

It is to be noted that, in the expression (10), N represents the number of samples configuring a frame of an audio signal, and $x_n$ represents a sample value of the nth (where n=0, . . . , N−1) sample in a frame.

Where a process is switched in response to the sound pressure RMS of an audio signal obtained in this manner, the following process can be performed.

For example, where the sound pressure RMS of an audio signal of an object is −6 dB or more with respect to 0 dB that is the full scale of the sound pressure RMS, only the processes A1 to A3 are performed as usual, but where the sound pressure RMS of an object is lower than −6 dB, a binarization process for a VBAP gain is performed.

Generally, where sound has a high sound pressure, deterioration of the sound quality is likely to stand out, and such sound is often sound of an object having a high importance degree. Therefore, here in regard to an object of sound having a high sound pressure RMS, the sound quality is prevented from being deteriorated while, in regard to an object of sound having a low sound pressure RMS, a binarization process is performed such that the processing amount is reduced on the whole. By this, even by a renderer of a small hardware scale, rendering can be performed sufficiently, and besides, sound of quality as high as possible can be obtained.

Alternatively, a mesh number switching process may be performed in response to the sound pressure RMS of an audio signal of an object such that the total number of meshes is changed appropriately. In this case, for example, the total number of meshes may be increased as the sound pressure RMS of the object increases, and the total number of meshes can be changed among multiple stages.

Further, a combination of a quantization process or a mesh number switching process may be selected in response to the object number, the importance information and the sound pressure RMS.

In particular, a VBAP gain may be calculated by a process according to a result of selection, on the basis of the object number, the importance information and the sound pressure RMS, of whether or not a quantization process is to be performed, into how many gains a VBAP gain is to be quantized in the quantization process, namely, the quantization number upon the quantization processing, and the total number of meshes to be used for calculation of a VBAP gain. In such a case, for example, such a process as given below can be performed.

For example, where the object number is 10 or more, the total number of meshes is set to 10 and besides a binarization process is performed. In this case, since the object number is great, the processing amount is reduced by reducing the total number of meshes and performing a binarization process. Consequently, even where the hardware scale of a renderer is small, rendering of all objects can be performed.

Meanwhile, where the object number is smaller than 10 and besides the value of the importance information is the highest value, only the processes A1 to A3 are performed as usual. Consequently, for an object having a high importance degree, sound can be reproduced without deteriorating the sound quality.

Where the object number is smaller than 10 and besides the value of the importance information is not the highest value and besides the sound pressure RMS is equal to or higher than −30 dB, the total number of meshes is set to 10 and besides a ternarization process is performed. This makes it possible to reduce the processing amount upon rendering processing to such a degree that, in regard to sound that has a high sound pressure although the importance degree is low, sound quality deterioration of the sound does not stand out.

Further, where the object number is smaller than 10 and besides the value of the importance information is not the highest value and besides the sound pressure RMS is lower than −30 dB, the total number of meshes is set to 5 and further a binarization process is performed. This makes it possible to sufficiently reduce the processing amount upon rendering processing in regard to sound that has a low importance degree and has a low sound pressure.

In this manner, when the object number is great, the processing amount upon rendering processing is reduced such that rendering of all objects can be performed, but when the object number is small to some degree, an appropriate process is selected and rendering is performed for each object. Consequently, while assurance of the sound quality and reduction of the processing apparatus are balanced well for each object, sound can be reproduced with sufficient sound quality by a small processing amount on the whole.

Example of Configuration of Audio Processing Apparatus

Figure 17:
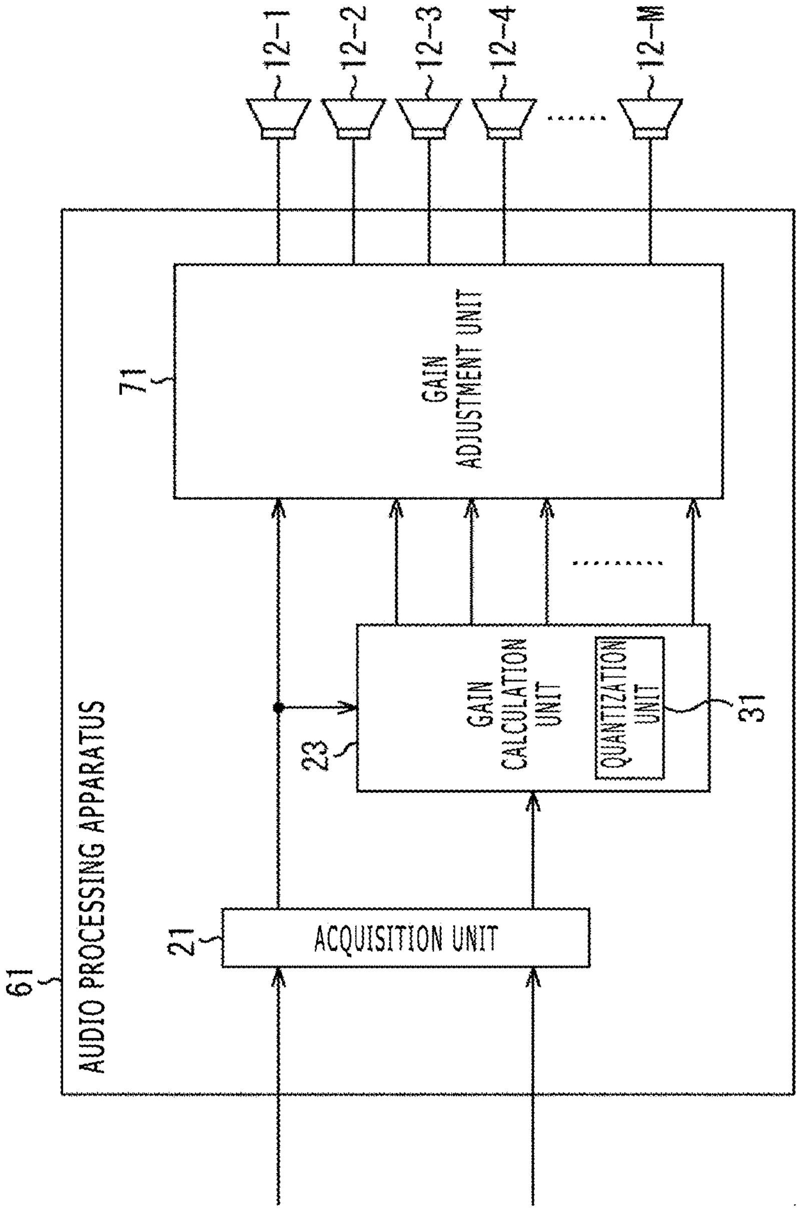
FIG. 17 is a view depicting an example of a configuration of the audio processing apparatus.

Now, an audio processing apparatus that performs a rendering process while suitably performing a quantization process, a mesh number switching process and so forth described above is described. FIG. 17 is a view depicting an example of a particular configuration of such an audio processing apparatus as just described. It is to be noted that, in FIG. 17, portions corresponding to those in the case of FIG. 6 are denoted by like reference symbols and description of them is omitted suitably.

The audio processing apparatus 61 depicted in FIG. 17 includes an acquisition unit 21, a gain calculation unit 23 and a gain adjustment unit 71. The gain calculation unit 23 receives metadata and audio signals of objects supplied from the acquisition unit 21, calculates a VBAP gain for each of the speakers 12 for each object and supplies the calculated VBAP gains to the gain adjustment unit 71.

Further, the gain calculation unit 23 includes a quantization unit 31 that performs quantization of the VBAP gains.

The gain adjustment unit 71 multiplies an audio signal supplied from the acquisition unit 21 by the VBAP gains for the individual speakers 12 supplied from the gain calculation unit 23 for each object to generate audio signals for the individual speakers 12 and supplies the audio signals to the speakers 12.

<Explanation of Reproduction Process>

Subsequently, operation of the audio processing apparatus 61 depicted in FIG. 17 is described. In particular, a reproduction process by the audio processing apparatus 61 is described with reference to a flow chart of FIG. 18.

It is to be noted that it is assumed that, in the present example, an audio signal and metadata of one object or each of a plurality of objects are supplied for each frame to the acquisition unit 21 and a reproduction process is performed for each frame of an audio signal of each object.

At step S231, the acquisition unit 21 acquires an audio signal and metadata of an object from the outside and supplies the audio signal to the gain calculation unit 23 and the gain adjustment unit 71 while it supplies the metadata to the gain calculation unit 23. Further, the acquisition unit 21 acquires also information of the number of objects with regard to which sound is to be reproduced simultaneously in a frame that is a processing target, namely, of the object number and supplies the information to the gain calculation unit 23.

At step S232, the gain calculation unit 23 decides whether or not the object number is equal to or greater than 10 on the basis of the information representative of an object number supplied from the acquisition unit 21.

If it is decided at step S232 that the object number is equal to or greater than 10, then the gain calculation unit 23 sets the total number of meshes to be used upon VBAP gain calculation to 10 at step S233. In other words, the gain calculation unit 23 selects 10 as the total number of meshes.

Further, the gain calculation unit 23 selects a predetermined number of speakers 12 from among all of the speakers 12 in response to the selected total number of meshes such that the number of meshes equal to the total number are formed on the unit spherical surface. Then, the gain calculation unit 23 determines 10 meshes on the unit spherical surface formed from the selected speakers 12 as meshes to be used upon VBAP gain calculation.

At step S234, the gain calculation unit 23 calculates a VBAP gain for each speaker 12 by the VBAP on the basis of location information indicative of locations of the speakers 12 configuring the 10 meshes determined at step S233 and position information included in the metadata supplied from the acquisition unit 21 and indicative of the positions of the objects.

In particular, the gain calculation unit 23 successively performs calculation of the expression (8) using the meshes determined at step S233 in order as a mesh of a processing target to calculate the VBAP gain of the speakers 12. At this time, a new mesh is successively determined as a mesh of the processing target until the VBAP gains calculated in regard to three speakers 12 configuring the mesh of the processing target all indicate values equal to or greater than 0 to successively calculate VBAP gains.

At step S235, the quantization unit 31 binarizes the VBAP gains of the speakers 12 obtained at step S234, whereafter the processing advances to step S246.

If it is decided at step S232 that the object number is smaller than 10, then the processing advances to step S236.

At step S236, the gain calculation unit 23 decides whether or not the value of the importance information of the objects included in the metadata supplied from the acquisition unit 21 is the highest value. For example, if the value of the importance information is the value "7" indicating that the importance degree is highest, then it is decided that the importance information indicates the highest value.

If it is decided at step S236 that the importance information indicates the highest value, then the processing advances to step S237.

At step S237, the gain calculation unit 23 calculates a VBAP gain for each speaker 12 on the basis of the location information indicative of the locations of the speakers 12 and the position information included in the metadata supplied from the acquisition unit 21, whereafter the processing advances to step S246. Here, the meshes formed from all speakers 12 are successively determined as a mesh of a processing target, and a VBAP gain is calculated by calculation of the expression (8).

On the other hand, if it is decided at step S236 that the importance information does not indicate the highest value, then at step S238, the gain calculation unit 23 calculates the sound pressure RMS of the audio signal supplied from the acquisition unit 21. In particular, calculation of the expression (10) given hereinabove is performed for a frame of the audio signal that is a processing target to calculate the sound pressure RMS.

At step S239, the gain calculation unit 23 decides whether or not the sound pressure RMS calculated at step S238 is equal to or higher than −30 dB.

If it is decided at step S239 that the sound pressure RMS is equal to or higher than −30 dB, then processes at steps S240 and S241 are performed. It is to be noted that the processes at steps S240 and S241 are similar to those at steps S233 and S234, respectively, and therefore, description of them is omitted.

At step S242, the quantization unit 31 ternarizes the VBAP gain for each speaker 12 obtained at step S241, whereafter the processing advances to step S246.

On the other hand, if it is decided at step S239 that the sound pressure RMS is lower than −30 dB, then the processing advances to step S243.

At step S243, the gain calculation unit 23 sets the total number of meshes to be used upon VBAP gain calculation to 5.

Further, the gain calculation unit 23 selects a predetermined number of speakers 12 from among all speakers 12 in response to the selected total number "5" of meshes and determines five meshes on a unit spherical surface formed from the selected speakers 12 as meshes to be used upon VBAP gain calculation.

After the meshes to be used upon VBAP gain calculation are determined, processes at steps S244 and S245 are performed, and then the processing advances to step S246. It is to be noted that the processes at steps S244 and S245 are similar to the processes at steps S234 and S235, and therefore, description of them is omitted.

After the process at step S235, S237, S242 or S245 is performed and VBAP gains for the speakers 12 are obtained, processes at steps S246 to S248 are performed, thereby ending the reproduction process.

It is to be noted that, since the processes at steps S246 to S248 are similar to the processes at steps S17 to S19 described hereinabove with reference to FIG. 7, respectively, description of them is omitted.

However, more particularly, the reproduction process is performed substantially simultaneously in regard to the individual objects, and at step S248, audio signals for the speakers 12 obtained for the individual objects are supplied to the speakers 12. In particular, the speakers 12 reproduce sound on the basis of signals obtained by adding the audio signals of the objects. As a result, sound of all objects is outputted simultaneously.

The audio processing apparatus 61 selectively performs a quantization process and a mesh number switching process suitably for each object. By this, the processing amount of the rendering process can be reduced while deterioration of the presence or the sound quality is suppressed.

Modification 1 to Second Embodiment

Example of Configuration of Audio Processing Apparatus

Further, while, in the description of the second embodiment, an example in which, when a process for extending a sound image is not performed, a quantization process or a mesh number switching process is selectively performed is described, also when a process for extending a sound image is performed, a quantization process or a mesh number switching process may be performed selectively.

Figure 19:
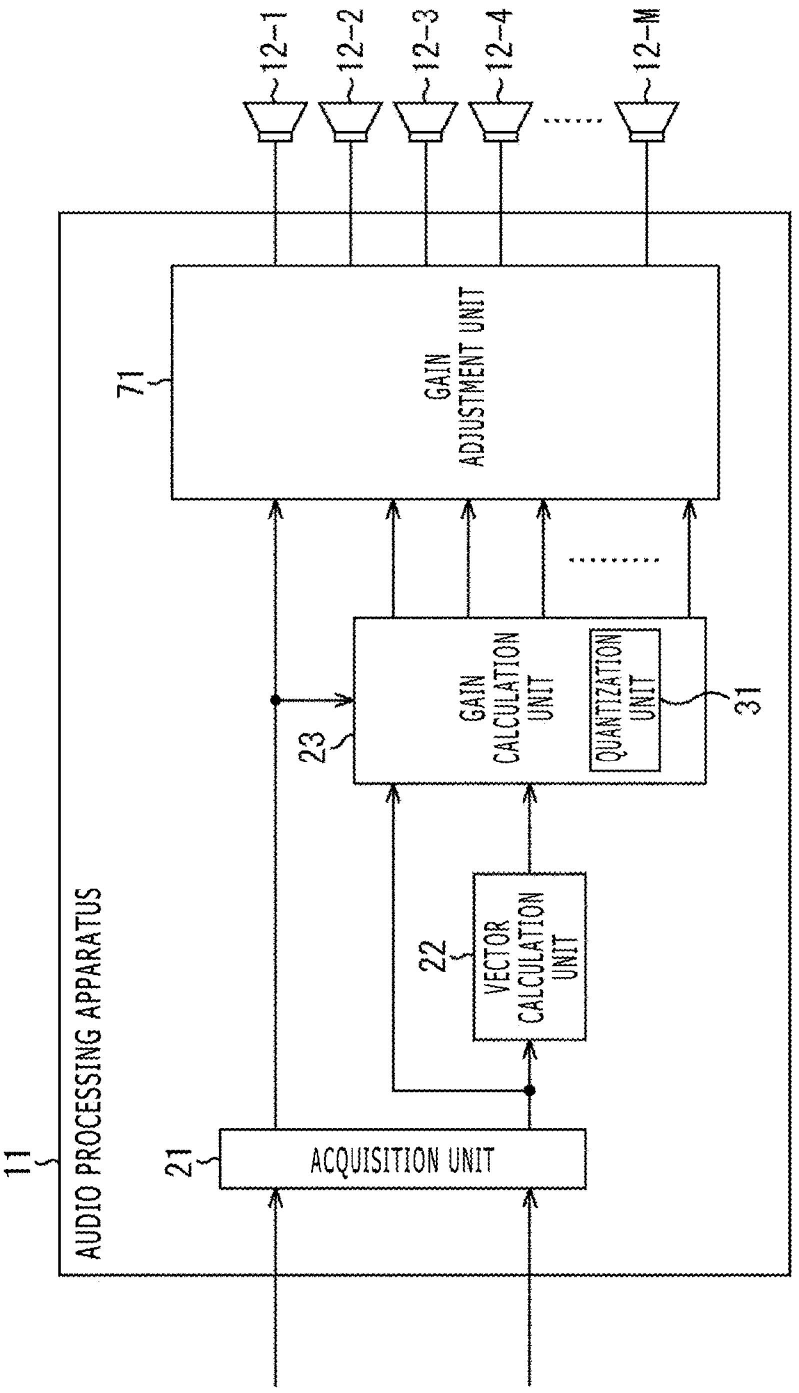
FIG. 19 is a view depicting an example of a configuration of the audio processing apparatus.

In such a case, the audio processing apparatus 11 is configured, for example, in such a manner as depicted in FIG. 19. It is to be noted that, in FIG. 19, portions corresponding to those in the case of FIG. 6 or 17 are denoted by like reference symbols and description of them is omitted suitably.

The audio processing apparatus 11 depicted in FIG. 19 includes an acquisition unit 21, a vector calculation unit 22, a gain calculation unit 23 and a gain adjustment unit 71.

The acquisition unit 21 acquires an audio signal and metadata of an object regarding one or a plurality of objects, and supplies the acquired audio signal to the gain calculation unit 23 and the gain adjustment unit 71 and supplies the acquired metadata to the vector calculation unit 22 and the gain calculation unit 23. Further, the gain calculation unit 23 includes a quantization unit 31.

<Explanation of Reproduction Process>

Now, a reproduction process performed by the audio processing apparatus 11 depicted in FIG. 19 is described with reference to a flow chart of FIG. 20.

It is to be noted that it is assumed in the present example that, in regard to one or a plurality of objects, an audio signal of an object and metadata are supplied for each frame to the acquisition unit 21 and the reproduction process is performed for each frame of the audio signal for each object.

Further, since processes at steps S271 and S272 are similar to the processes at steps S11 and S12 of FIG. 7, respectively, description of them is omitted. However, at step S271, the audio signals acquired by the acquisition unit 21 are supplied to the gain calculation unit 23 and the gain adjustment unit 71, and the metadata acquired by the acquisition unit 21 are supplied to the vector calculation unit 22 and the gain calculation unit 23.

When the processes at steps S271 and S272 are performed, spread vectors or spread vectors and a vector p are obtained.

At step S273, the gain calculation unit 23 performs a VBAP gain calculation process to calculate a VBAP gain for each speaker 12. It is to be noted that, although details of the VBAP gain calculation process are hereinafter described, in the VBAP gain calculation process, a quantization process or a mesh number switching process is selectively performed to calculate a VBAP gain for each speaker 12.

After the process at step S273 is performed and the VBAP gains for the speakers 12 are obtained, processes at steps S274 to S276 are performed and the reproduction process ends. However, since those processes are similar to the processes at steps S17 to S19 of FIG. 7, respectively, description of them is omitted. However, more particularly, a reproduction process is performed substantially simultaneously in regard to the objects, and at step S276, audio signals for the speaker 12 obtained for the individual objects are supplied to the speakers 12. Therefore, sound of all objects is outputted simultaneously from the speakers 12.

The audio processing apparatus 11 selectively performs a quantization process or a mesh number switching process suitably for each object in such a manner as described above. By this, also where a process for extending a sound image is performed, the processing amount of a rendering process can be reduced while deterioration of the presence or the sound quality is suppressed.

<Explanation of VBAP Gain Calculation Process>

Figure 20:
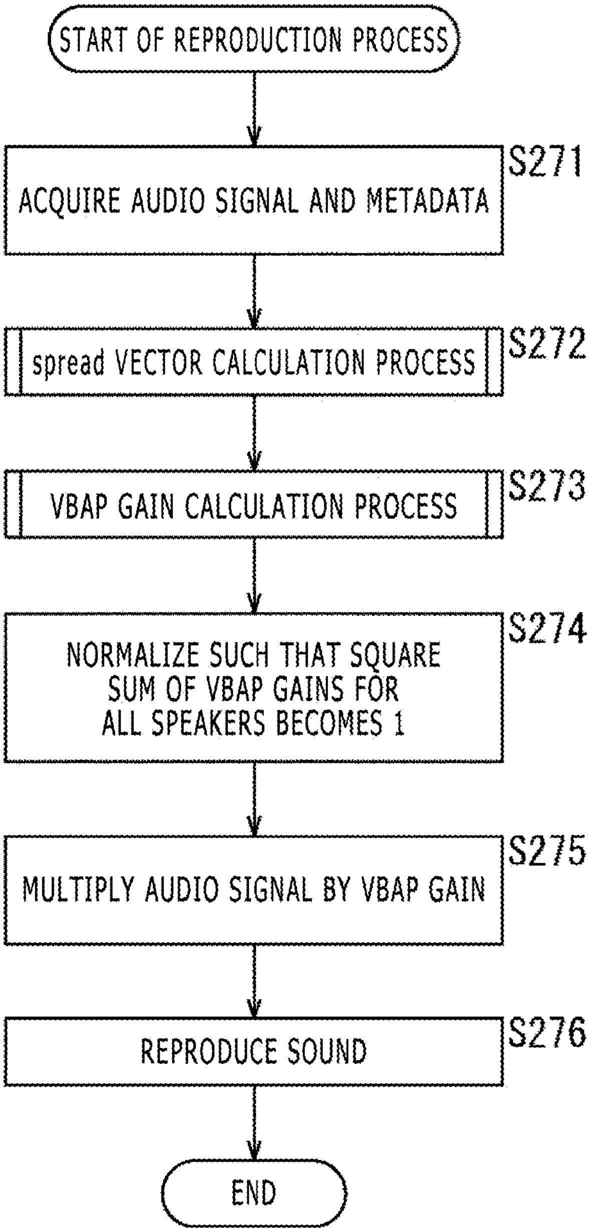
FIG. 20 is a flow chart illustrating a reproduction process.
Figure 21:
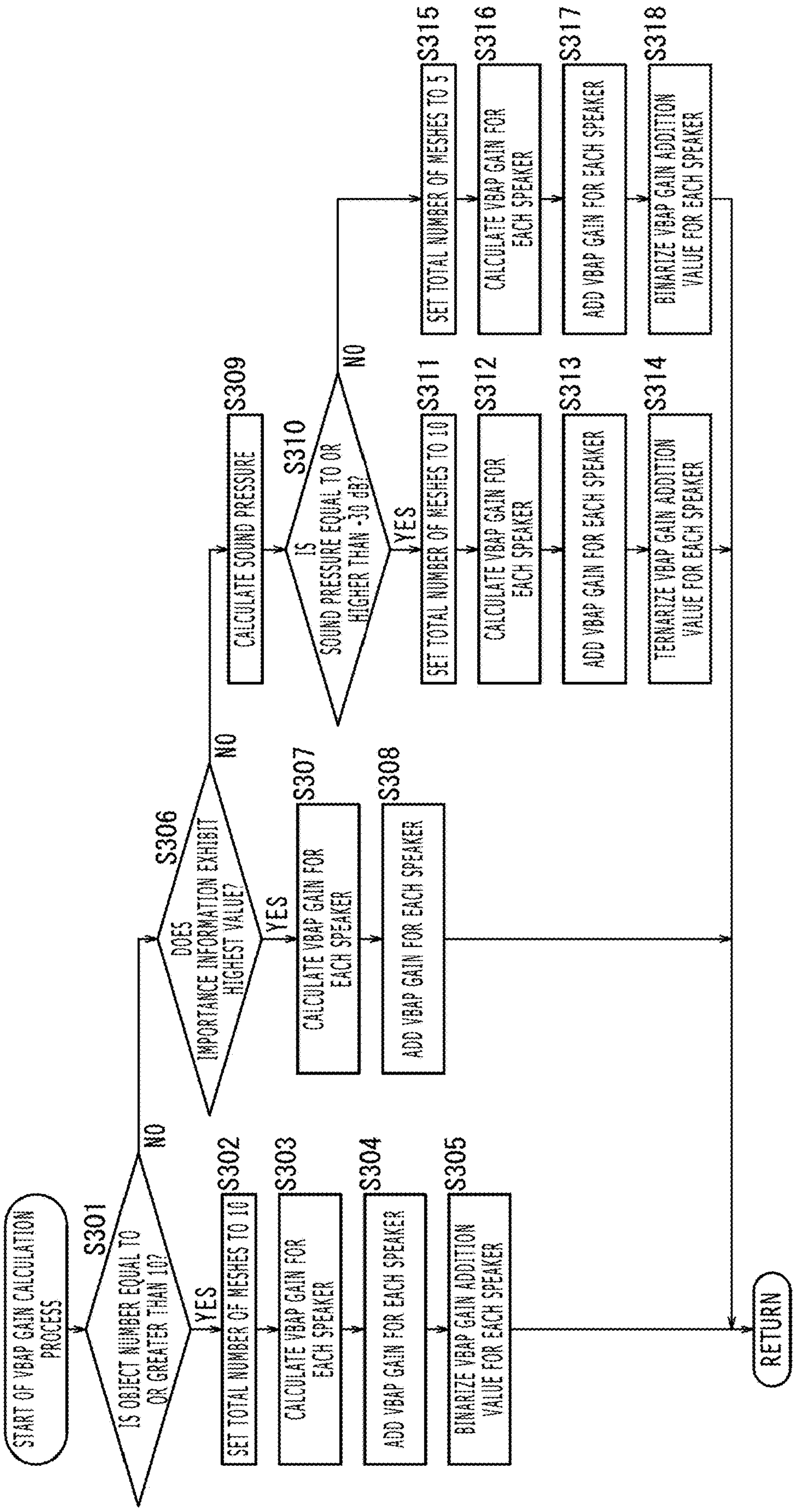
FIG. 21 is a flow chart illustrating a VBAP gain calculation process.

Now, a VBAP gain calculation process corresponding to the process at step S273 of FIG. 20 is described with reference to a flow chart of FIG. 21.

Figure 18:
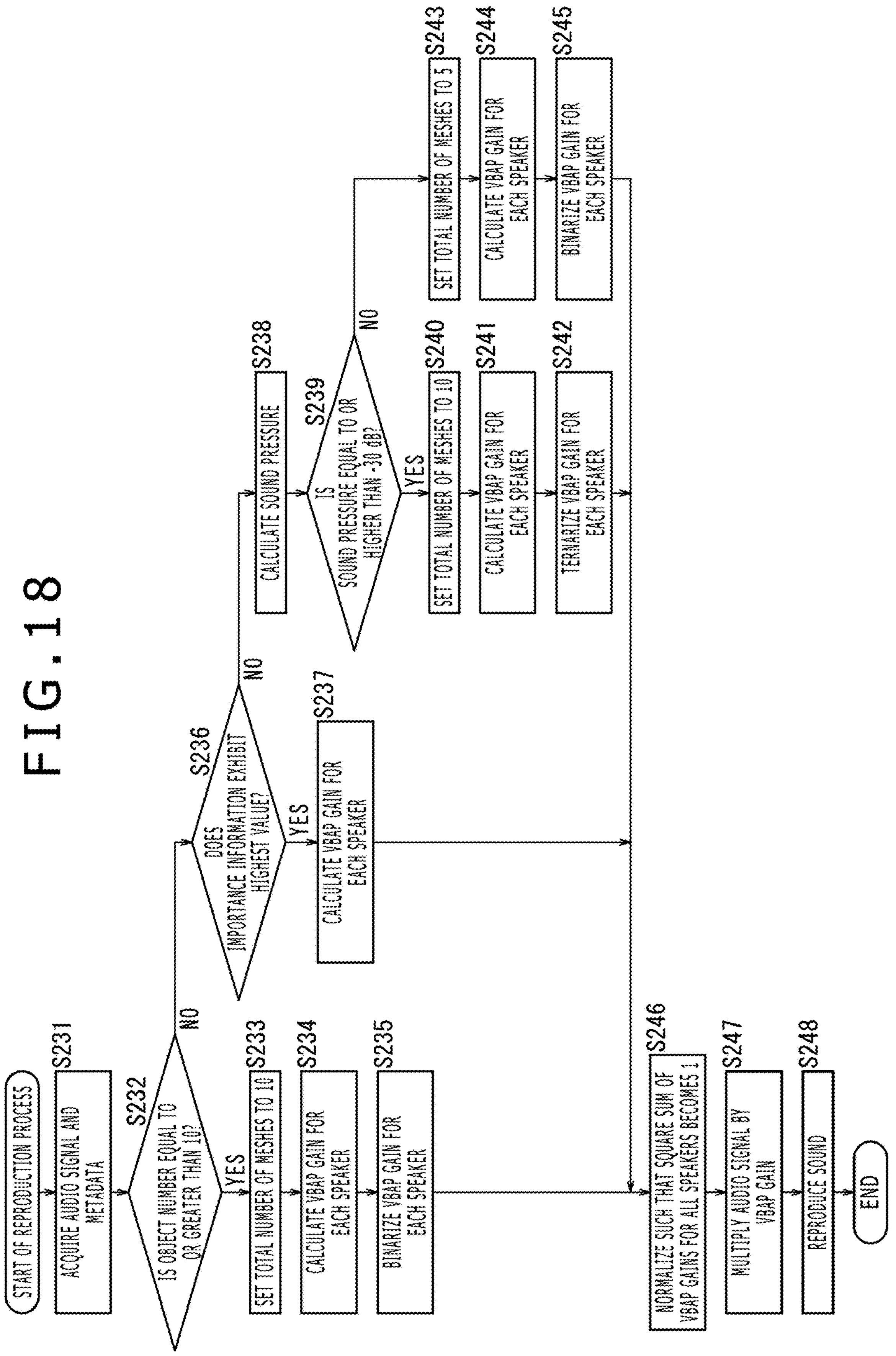
FIG. 18 is a flow chart illustrating a reproduction process.

It is to be noted that, since processes at steps S301 to S303 are similar to the processes at steps S232 to S234 of FIG. 18, respectively, description of them is omitted. However, at step S303, a VBAP gain is calculated for each speaker 12 in regard to each of the vectors of the spread vectors or the spread vectors and vector p.

At step S304, the gain calculation unit 23 adds the VBAP gains calculated in regard to the vectors for each speaker 12 to calculate a VBAP gain addition value. At step S304, a process similar to that at step S14 of FIG. 7 is performed.

At step S305, the quantization unit 31 binarizes the VBAP gain addition value obtained for each speaker 12 by the process at step S304 and then the calculation process ends, whereafter the processing advances to step S274 of FIG. 20.

On the other hand, if it is decided at step S301 that the object number is smaller than 10, processes at steps S306 and S307 are performed.

It is to be noted that, since the processes at step S306 and S307 are similar to the processes at step S236 and step S237 of FIG. 18, respectively, description of them is omitted. However, at step S307, a VBAP gain is calculated for each speaker 12 in regard to each of the vectors of the spread vectors or the spread vectors and vector p.

Further, after the process at step S307 is performed, a process at step 308 is performed and the VBAP gain calculation process ends, whereafter the processing advances to step S274 of FIG. 20. However, since the process at step S308 is similar to the process at step S304, description of it is omitted.

Further, if it is decided at step S306 that the importance information does not indicate the highest value, then processes at steps S309 to S312 are performed. However, since the processes are similar to the processes at steps S238 to S241 of FIG. 18, description of them is omitted. However, at step S312, a VBAP gain is calculated for each speaker 12 in regard to each of the vectors of spread vectors or spread vectors and vector p.

After the VBAP gains for the speakers 12 are obtained in regard to the vectors, a process at step S313 is performed to calculate a VBAP gain addition value. However, since the process at step S313 is similar to the process at step S304, description of it is omitted.

At step S314, the quantization unit 31 ternarizes the VBAP gain addition value obtained for each speaker 12 by the process at step S313 and the VBAP gain calculation ends, whereafter the processing advances to step S274 of FIG. 20.

Further, if it is decided at step S310 that the sound pressure RMS is lower than −30 dB, then a process at step S315 is performed and the total number of meshes to be used upon VBAP gain calculation is set to 5. It is to be noted that the process at step S315 is similar to the process at step S243 of FIG. 18, and therefore, description of it is omitted.

After meshes to be used upon VBAP gain calculation are determined, processes at steps S316 to S318 are performed and the VBAP gain calculation process ends, whereafter the processing advances to step S274 of FIG. 20. It is to be noted that the processes at steps S316 to S318 are similar to the processes at steps S303 to S305, and therefore, description of them is omitted.

The audio processing apparatus 11 selectively performs a quantization process or a mesh number switching process suitably for each object in such a manner as described above. By this, also where a process for extending a sound image is performed, the processing amount of a rendering process can be reduced while deterioration of the presence or the sound quality is suppressed.

Incidentally, while the series of processes described above can be executed by hardware, it may otherwise be executed by software. Where the series of processes is executed by software, a program that constructs the software is installed into a computer. Here, the computer includes a computer incorporated in hardware for exclusive use, for example, a personal computer for universal use that can execute various functions by installing various programs, and so forth.

Figure 22:
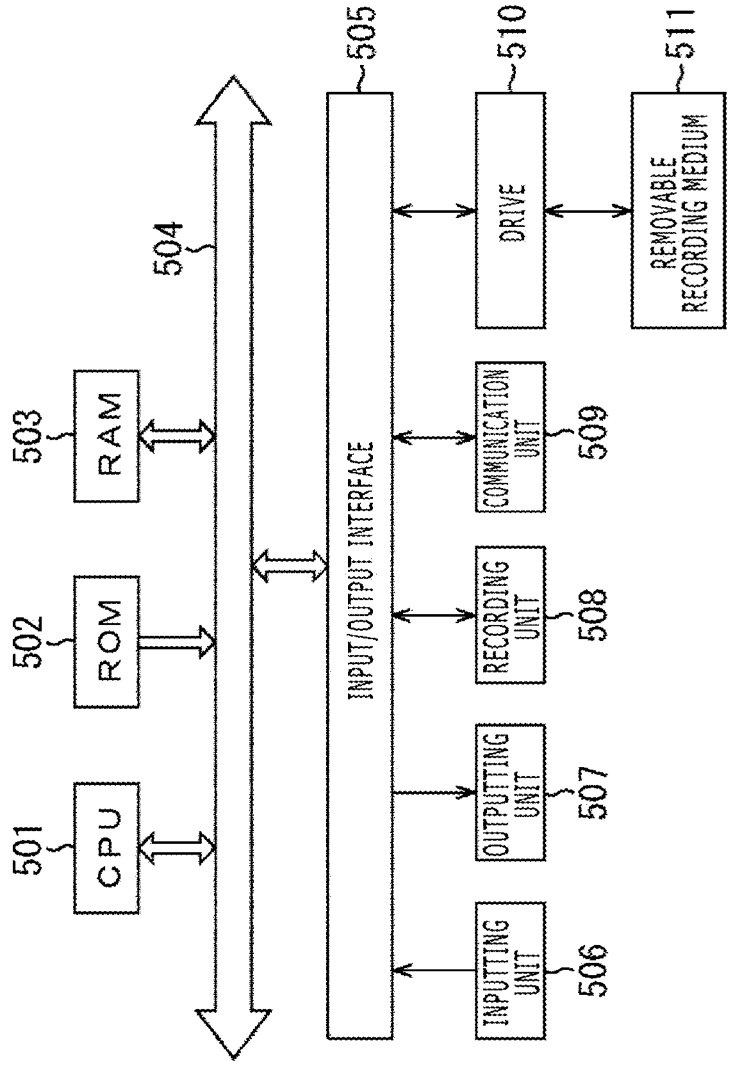
FIG. 22 is a view depicting an example of a configuration of a computer.

FIG. 22 is a block diagram depicting an example of a configuration of hardware of a computer that executes the series of processes described hereinabove in accordance with a program.

In the computer, a CPU (Central Processing Unit) 501, a ROM (Read Only Memory) 502 and a RAM (Random Access Memory) 503 are connected to each other by a bus 504.

To the bus 504, an input/output interface 505 is connected further. To the input/output interface 505, an inputting unit 506, an outputting unit 507, a recording unit 508, a communication unit 509 and a drive 510 are connected.

The inputting unit 506 is configured from a keyboard, a mouse, a microphone, an image pickup element and so forth. The outputting unit 507 is configured from a display unit, a speaker and so forth. The recording unit 508 is configured from a hard disk, a nonvolatile memory and so forth. The communication unit 509 is configured from a network interface and so forth. The drive 510 drives a removable recording medium 511 such as a magnetic disk, an optical disk, a magneto-optical disk or a semiconductor memory.

In the computer configured in such a manner as described above, the CPU 501 loads a program recorded, for example, in the recording unit 508 into the RAM 503 through the input/output interface 505 and the bus 504 and executes the program to perform the series of processes described hereinabove.

The program executed by the computer (CPU 501) can be recorded on and provided as the removable recording medium 511, for example, as a package medium or the like. Further, the program can be provided through a wired or wireless transmission medium such as a local area network, the Internet or a digital satellite broadcast.

In the computer, the program can be installed into the recording unit 508 through the input/output interface 505 by loading the removable recording medium 511 into the drive 510. Alternatively, the program can be received by the communication unit 509 through a wired or wireless transmission medium and installed into the recording unit 508. Alternatively, the program may be installed in advance into the ROM 502 or the recording unit 508.

It is to be noted that the program executed by the computer may be a program by which processes are performed in a time series in accordance with an order described in the present specification or a program in which processes are performed in parallel or are performed at a timing at which the program is called or the like.

Further, embodiments of the present technology is not limited to the embodiments described hereinabove and can be altered in various manners without departing from the subject matter of the present technology.

For example, the present technology can assume a configuration for cloud computing by which one function is shared and processed cooperatively by a plurality of apparatuses through a network.

Further, the steps described with reference to the flow charts described hereinabove can be executed by a single apparatus or can be executed in sharing by a plurality of apparatuses.

Further, where one step includes a plurality of processes, the plurality of processes included in the one step can be executed by a single apparatus or can be executed in sharing by a plurality of apparatuses.

Also it is possible for the present technology to take the following configurations.

(1)

An audio processing apparatus including:

an acquisition unit configured to acquire metadata including position information indicative of a position of an audio object and sound image information configured from a vector of at least two or more dimensions and representative of an extent of a sound image from the position;

a vector calculation unit configured to calculate, based on a horizontal direction angle and a vertical direction angle of a region representative of the extent of the sound image determined by the sound image information, a spread vector indicative of a position in the region; and a gain calculation unit configured to calculate, based on the spread vector, a gain of each of audio signals supplied to two or more sound outputting units positioned in the proximity of the position indicated by the position information.

(2)

The audio processing apparatus according to (1), in which the vector calculation unit calculates the spread vector based on a ratio between the horizontal direction angle and the vertical direction angle.

(3)

The audio processing apparatus according to (1) or (2), in which the vector calculation unit calculates the number of spread vectors determined in advance.

(4)

The audio processing apparatus according to (1) or (2), in which the vector calculation unit calculates a variable arbitrary number of spread vectors.

(5)

The audio processing apparatus according to (1), in which the sound image information is a vector indicative of a center position of the region.

(6)

The audio processing apparatus according to (1), in which the sound image information is a vector of two or more dimensions indicative of an extent degree of the sound image from the center of the region.

(7)

The audio processing apparatus according to (1), in which the sound image information is a vector indicative of a relative position of a center position of the region as viewed from a position indicated by the position information.

(8)

The audio processing apparatus according to any one of (1) to (7), in which the gain calculation unit calculates the gain for each spread vector in regard to each of the sound outputting units, calculates an addition value of the gains calculated in regard to the spread vectors for each of the sound outputting units, quantizes the addition value into a gain of two or more values for each of the sound outputting units, and calculates a final gain for each of the sound outputting units based on the quantized addition value.

(9)

The audio processing apparatus according to (8), in which the gain calculation unit selects the number of meshes each of which is a region surrounded by three ones of the sound outputting units and which number is to be used for calculation of the gain and calculates the gain for each of the spread vectors based on a result of the selection of the number of meshes and the spread vector.

(10)

The audio processing apparatus according to (9), in which the gain calculation unit selects the number of meshes to be used for calculation of the gain, whether or not the quantization is to be performed and a quantization number of the addition value upon the quantization and calculates the final gain in response to a result of the selection.

(11)

The audio processing apparatus according to (10), in which the gain calculation unit selects, based on the number of the audio objects, the number of meshes to be used for calculation of the gain, whether or not the quantization is to be performed and the quantization number.

(12)

The audio processing apparatus according to (10) or (11), in which the gain calculation unit selects, based on an importance degree of the audio object, the number of meshes to be used for calculation of the gain, whether or not the quantization is to be performed and the quantization number.

(13)

The audio processing apparatus according to (12), in which the gain calculation unit selects the number of meshes to be used for calculation of the gain such that the number of meshes to be used for calculation of the gain increases as the position of the audio object is positioned nearer to the audio object that is high in the importance degree.

(14)

The audio processing apparatus according to any one of (10) to (13), in which the gain calculation unit selects, based on a sound pressure of the audio signal of the audio object, the number of meshes to be used for calculation of the gain, whether or not the quantization is to be performed and the quantization number.

(15)

The audio processing apparatus according to any one of (9) to (14), in which the gain calculation unit selects, in response to a result of the selection of the number of meshes, three or more ones of the plurality of sound outputting units including the sound outputting units that are positioned at different heights from each other, and calculates the gain based on one or a plurality of meshes formed from the selected sound outputting units.

(16)

An audio processing method including the steps of:

acquiring metadata including position information indicative of a position of an audio object and sound image information configured from a vector of at least two or more dimensions and representative of an extent of a sound image from the position;

calculating, based on a horizontal direction angle and a vertical direction angle of a region representative of the extent of the sound image determined by the sound image information, a spread vector indicative of a position in the region; and calculating, based on the spread vector, a gain of each of audio signals supplied to two or more sound outputting units positioned in the proximity of the position indicated by the position information.

(17)

A program that causes a computer to execute a process including the steps of:

acquiring metadata including position information indicative of a position of an audio object and sound image information configured from a vector of at least two or more dimensions and representative of an extent of a sound image from the position;

calculating, based on a horizontal direction angle and a vertical direction angle of a region representative of the extent of the sound image determined by the sound image information, a spread vector indicative of a position in the region; and calculating, based on the spread vector, a gain of each of audio signals supplied to two or more sound outputting units positioned in the proximity of the position indicated by the position information.

(18)

An audio processing apparatus including:

an acquisition unit configured to acquire metadata including position information indicative of a position of an audio object; and a gain calculation unit configured to select the number of meshes each of which is a region surrounded by three sound outputting units and which number is to be used for calculation of a gain for an audio signal to be supplied to the sound outputting units and calculate the gain based on a result of the selection of the number of meshes and the position information.

REFERENCE SIGNS LIST

11 Audio processing apparatus, 21 Acquisition unit, 22 Vector calculation unit, 23 Gain calculation unit, 24 Gain adjustment unit, 31 Quantization unit, 61 Audio processing apparatus, 71 Gain adjustment unit

The invention claimed is:

1. An audio processing apparatus comprising:

an acquisition unit configured to acquire metadata including position information indicative of a position of an audio object and sound image information configured from a vector of two or more dimensions and representative of an extent of a sound image from the position;

a vector calculation unit configured to calculate, based on a horizontal direction angle and a vertical direction angle of a region representative of the extent of the sound image determined by the sound image information, a spread vector indicative of a position in the region; and a gain calculation unit configured to calculate, based on the spread vector, a gain of each of audio signals supplied to two or more sound outputting units positioned in the proximity of the position indicated by the position information, wherein the gain calculation unit calculates the gain for each spread vector in regard to each of the sound outputting units, calculates an addition value of the gains calculated in regard to the spread vectors for each of the sound outputting units, normalizes the addition value, and calculates a final gain for each of the sound outputting units based on the normalized addition value.

2. An audio processing method comprising the steps of:

acquiring metadata including position information indicative of a position of an audio object and sound image information configured from a vector of two or more dimensions and representative of an extent of a sound image from the position;

calculating, based on a horizontal direction angle and a vertical direction angle of a region representative of the extent of the sound image determined by the sound image information, a spread vector indicative of a position in the region; and calculating, based on the spread vector, a gain of each of audio signals supplied to two or more sound outputting units positioned in the proximity of the position indicated by the position information, wherein the calculating the gain including:

calculating the gain for each spread vector in regard to each of the sound outputting units, calculating an addition value of the gains calculated in regard to the spread vectors for each of the sound outputting units, normalizing the addition value, and calculating a final gain for each of the sound outputting units based on the normalized addition value.

3. A computer readable storage medium on which a program is stored that causes a computer to execute a process comprising the steps of:

acquiring metadata including position information indicative of a position of an audio object and sound image information configured from a vector of two or more dimensions and representative of an extent of a sound image from the position;

calculating, based on a horizontal direction angle and a vertical direction angle of a region representative of the extent of the sound image determined by the sound image information, a spread vector indicative of a position in the region; and calculating, based on the spread vector, a gain of each of audio signals supplied to two or more sound outputting units positioned in the proximity of the position indicated by the position information, wherein the calculating the gain including:

calculating the gain for each spread vector in regard to each of the sound outputting units, calculating an addition value of the gains calculated in regard to the spread vectors for each of the sound outputting units, normalizing the addition value, and calculating a final gain for each of the sound outputting units based on the normalized addition value.

* * * * *